United States Patent
Bhattad et al.

(10) Patent No.: US 10,701,671 B2
(45) Date of Patent: Jun. 30, 2020

(54) OVERHEAD REDUCTION IN MILLIMETER WAVE SYSTEMS

(71) Applicant: QUALCOMM Incorporated, San Diego, CA (US)

(72) Inventors: Kapil Bhattad, Bangalore (IN); Ananta Narayanan Thyagarajan, Bangalore (IN); Xiaoxia Zhang, San Diego, CA (US); Jing Sun, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/143,179

(22) Filed: Sep. 26, 2018

(65) Prior Publication Data

US 2019/0132829 A1    May 2, 2019

Related U.S. Application Data

(60) Provisional application No. 62/579,726, filed on Oct. 31, 2017.

(51) Int. Cl.
*H04L 5/00* (2006.01)
*H04L 27/26* (2006.01)
(Continued)

(52) U.S. Cl.
CPC ....... *H04W 72/0406* (2013.01); *H04L 5/0023* (2013.01); *H04L 5/0037* (2013.01);
(Continued)

(58) Field of Classification Search
CPC .......... H04B 7/02–0495; H04J 3/02–04; H04J 3/10–1688; H04J 11/0023–0066;
(Continued)

(56) References Cited

U.S. PATENT DOCUMENTS

| 2015/0117270 A1* | 4/2015 | Um ................ H04W 72/0446 |
| 2017/0099127 A1 | 4/2017 | Byun et al. |
| 2017/0367069 A1* | 12/2017 | Agiwal ............... H04B 7/0695 |

FOREIGN PATENT DOCUMENTS

KR    20090048846 A    5/2009

OTHER PUBLICATIONS

International Search Report and Written Opinion—PCT/US2018/053062—ISA/EPO—dated Jan. 14, 2019.

* cited by examiner

*Primary Examiner* — Timothy J Weidner
(74) *Attorney, Agent, or Firm* — Qualcomm Incorporated

(57) ABSTRACT

Methods, systems, and devices for wireless communications are described. One method may include determining symbol level scheduling for symbols allocated to a plurality of user equipments (UEs) within a transmission time interval (TTI); transmitting, in a control channel of the TTI, control information indicating the symbol level scheduling; and communicating, in accordance with the symbol level scheduling, the symbols within the TTI in a plurality of beamformed transmissions. Another method may include receiving, by a UE, control information in a control channel of a TTI; processing the control information to determine a subset of symbols of the TTI allocated to the UE, a symbol length or duration of the subset of the symbols allocated to the UE, and symbol level scheduling for the subset of the symbols within the TTI; and receiving the subset of the symbols based on the control information.

26 Claims, 19 Drawing Sheets

(51) Int. Cl.
*H04W 72/04* (2009.01)
*H04W 72/12* (2009.01)
*H04W 88/02* (2009.01)
*H04W 88/10* (2009.01)
*H04W 92/10* (2009.01)
*H04W 88/08* (2009.01)

(52) U.S. Cl.
CPC .......... *H04L 5/0039* (2013.01); *H04L 5/0041* (2013.01); *H04L 5/0094* (2013.01); *H04L 27/2602* (2013.01); *H04L 27/2605* (2013.01); *H04L 27/2607* (2013.01); *H04L 27/2666* (2013.01); *H04W 72/042* (2013.01); *H04W 72/046* (2013.01); *H04W 72/0446* (2013.01); *H04W 72/0453* (2013.01); *H04W 72/1289* (2013.01); *H04W 88/02* (2013.01); *H04W 88/08* (2013.01); *H04W 92/10* (2013.01)

(58) Field of Classification Search
CPC .... H04J 2011/0003–002; H04L 5/0001–0098; H04L 27/26–30; H04W 16/28; H04W 24/02; H04W 28/02–0215; H04W 28/06–085; H04W 48/02; H04W 48/20; H04W 72/005–14; H04W 74/006; H04W 88/02; H04W 88/06; H04W 88/08; H04W 88/10; H04W 92/10

See application file for complete search history.

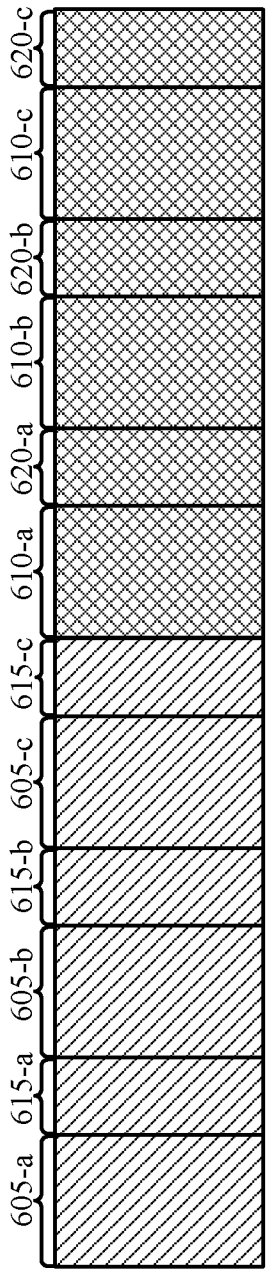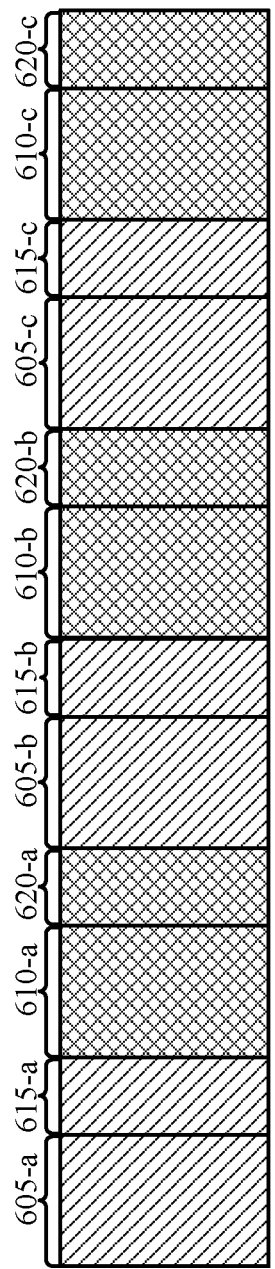
FIG. 6A
FIG. 6B

OVERHEAD REDUCTION IN MILLIMETER WAVE SYSTEMS

CROSS REFERENCES

The present Application for patent claims the benefit of U.S. Provisional Patent Application No. 62/579,726 by BHATTAD, et al., entitled "OVERHEAD REDUCTION IN MILLIMETER WAVE SYSTEMS," filed Oct. 31, 2017, assigned to the assignee hereof, and expressly incorporated herein.

BACKGROUND

The following relates generally to wireless communication, and more specifically to overhead reduction in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may transmit a block of symbols (e.g., orthogonal frequency division multiple (OFDM) symbols) on a channel (e.g., physical downlink shared channel (PDSCH)) that may be received by a UE. In a multipath environment, two or more symbols may traverse paths of different lengths and reach the UE at different times. As a result, the UE may start to receive one symbol while still receiving a previous symbol. The overlap between when different symbols are received is referred to as inter-symbol interference (ISI) and may degrade the ability of the UE to successfully receive and decode each of the symbols.

Conventional wireless communication systems may decrease the effects of ISI by providing a guard interval where nothing is transmitted between the transmission of each symbol. Another conventional solution is to use a cyclic prefix or a cyclic suffix. The cyclic prefix or the cyclic suffix may be a cyclic repetition of the block of symbols in a head or a tail of the block. Guard interval, cyclic prefix, or cyclic suffix are techniques to deal with ISI in a frequency selective channel, and may help a receiver equalize and/or demodulate each block of symbols separately. Cyclic prefix may refer to adding a copy of an ending portion of a symbol to a beginning of the symbol. Cyclic suffix may refer to adding a copy of a beginning portion of a symbol to an end of the symbol. A receiver may typically discard the cyclic prefix or cyclic suffix. Although, the conventional techniques support reduction of ISI, conventional techniques detrimentally add overhead and decrease throughput. For instance, guard interval is overhead that separates the symbols in time but reduces the number of symbols that can be transmitted within a time interval.

SUMMARY

The described techniques relate to improved methods, systems, devices, or apparatuses that support symbol level time division multiplexing (TDM) for guard interval and cyclic prefix overhead reduction in millimeter wave (mmW) mmW systems. A base station may allocate symbols within a same transmission time interval (TTI) to different user equipments (UEs). The base station may communicate the symbols within the TTI to the different UEs in a set of beamformed transmissions in a manner that decreases overhead by reducing a length of, or eliminating, a guard interval, cyclic prefix, or cyclic suffix, without detrimentally increasing inter-symbol interference (ISI).

In an example, a base station may determine symbol level scheduling of a TTI for multiple UEs that allocates one or more symbols of the TTI to a respective UE of the multiple UEs. In some cases, the symbol level scheduling may indicate that a contiguous set of symbols are allocated to a UE. In other cases, the symbol level scheduling may indicate that a discontiguous set of symbols are allocated to a UE. In some cases, ISI may occur between symbols that are allocated to a same UE. In conventional systems, even with adjacent symbols being allocated to different UEs, ISI mitigation may not be achieved because symbols are transmitted in omnidirectional or isotropic transmissions. In addition, conventional systems supporting these omnidirectional or isotropic transmissions do not allocate symbols within a same TTI to different UEs because the scheduling complexity is higher and no identified advantage exists for supporting such scheduling.

The techniques described herein may utilize beamforming or highly directional transmissions which reduce or eliminate ISI between different beams, permitting a base station to schedule different UEs within a same TTI on a symbol by symbol basis. In beamforming, a beamformed transmission is communicated in a particular direction to a first UE, and a second UE that is not located in that direction is unlikely to receive, or experience interference due to, that beamformed transmission. A base station may thus select two or more UEs that are at different locations, and shorten a length of, or eliminate, a guard interval, cyclic prefix, or cyclic suffix, without having ISI detrimentally impact throughput.

After determining the symbol level scheduling, the base station may transmit control information indicating the scheduling to the UEs. For example, a base station may transmit downlink control information (DCI) on a physical downlink control channel (PDCCH) of a TTI. In some examples, the DCI may be UE-specific. A UE may decode its DCI to determine a subset of symbols of a TTI allocated to it and determine symbol level scheduling for the subset of symbols. In some examples, the DCI may specify a length of guard interval, cyclic prefix, or cyclic suffix between some or all symbols of the TTI. In some examples, the UE may implicitly determine a length of guard interval, cyclic prefix, or cyclic suffix between some or all symbols of the TTI. For instance, the DCI may indicate that a discontiguous set of symbols (e.g., every other symbol) is allocated to a particular UE, and that UE may infer that there is no guard interval, cyclic prefix, or cyclic suffix, or that the guard interval, cyclic prefix, or cyclic suffix is a particular length.

Whether the length is implicitly determined or explicitly signaled, the UE may process its DCI to determine one or more symbols of a TTI allocated to the UE, and a length, if any, of the guard interval, cyclic prefix, or cyclic suffix between each symbol of the TTI. The base station and UEs may then communicate the symbols in the TTI as a set of beamformed transmissions where the determined length separates each symbol of the TTI. In some examples, a symbol of a TTI may be communicated in a downlink beamformed transmission from the base station to a UE, or in an uplink beamformed transmission from a UE to the base station. The base station may thus use the DCI to indicate the symbol level scheduling to multiple UEs and the length of the guard interval, cyclic prefix, or cyclic suffix that may dynamically change on a TTI by TTI basis. Beneficially, the techniques described herein may provide for symbol level scheduling to different UEs within a same TTI, and hence increase throughput by reducing or eliminating guard interval, cyclic prefix, or cyclic suffix without ISI significantly degrading throughput.

A method for wireless communication is described. The method may include receiving, by a UE, control information in a control channel of a TTI; processing the control information to determine a subset of a plurality of symbols of the TTI allocated to the UE, a symbol length or duration of the subset of the plurality of symbols allocated to the UE, symbol level scheduling for the subset of the plurality of symbols within the TTI, and whether symbols of the subset are contiguous or discontiguous within the TTI; and receiving the subset of the plurality of symbols based at least in part on the control information.

An apparatus for wireless communication is described. The apparatus may include means for receiving, by the apparatus, control information in a control channel of a TTI; means for processing the control information to determine a subset of a plurality of symbols of the TTI allocated to the apparatus, a symbol length or duration of the subset of the plurality of symbols allocated to the apparatus, symbol level scheduling for the subset of the plurality of symbols within the TTI, and whether symbols of the subset are contiguous or discontiguous within the TTI; and receiving the subset of the plurality of symbols based at least in part on the control information.

Another apparatus for wireless communication is described. The apparatus may include a processor, memory in electronic communication with the processor, and instructions stored in the memory. The instructions may be operable to cause the processor to receive control information in a control channel of a TTI; process the control information to determine a subset of a plurality of symbols of the TTI allocated to the apparatus, a symbol length or duration of the subset of the plurality of symbols allocated to the UE, symbol level scheduling for the subset of the plurality of symbols within the TTI, and whether symbols of the subset are contiguous or discontiguous within the TTI; and receive the subset of the plurality of symbols based at least in part on the control information.

A non-transitory computer-readable medium for wireless communication is described. The non-transitory computer-readable medium may include instructions operable to cause a processor to receive control information in a control channel of a TTI; process the control information to determine a subset of a plurality of symbols of the TTI allocated to the apparatus, a symbol length or duration of the subset of the plurality of symbols allocated to the UE, symbol level scheduling for the subset of the plurality of symbols within the TTI, and whether symbols of the subset are contiguous or discontiguous within the TTI; and receive the subset of the plurality of symbols based at least in part on the control information.

Some examples of the method, apparatus, and non-transitory computer-readable medium described above may further include processes, features, means, or instructions for processing the control information to determine a position within the TTI associated with each symbol of the subset of the plurality of symbols; and determining that the subset of the plurality of symbols are contiguous or discontiguous based at least in part on the determined positions. Some examples of the method, apparatus, and non-transitory computer-readable medium described above may further include processes, features, means, or instructions for determining the symbol length based at least in part on the control information. Some examples of the method, apparatus, and non-transitory computer-readable medium described above may further include processes, features, means, or instructions for determining a length of a guard interval, or a cyclic prefix, or a cyclic suffix, associated with the plurality of symbols of the TTI based at least in part on whether the symbols of the subset are contiguous or discontiguous within the TTI.

Some examples of the method, apparatus, and non-transitory computer-readable medium described above may further include processes, features, means, or instructions for processing the control information to determine a TDM schedule for the TTI, the TDM schedule indicating a scheduling order in the TTI for the symbols of the subset. Some examples of the method, apparatus, and non-transitory computer-readable medium described above for receiving the subset of the plurality of symbols may further include processes, features, means, or instructions for receiving the subset of the plurality of symbols based at least in part on the TDM schedule for the TTI.

Some examples of the method, apparatus, and non-transitory computer-readable medium described above may further include processes, features, means, or instructions for processing the control information to determine that each symbol of the plurality of symbols of the TTI has a guard interval, or a cyclic prefix, or a cyclic suffix, and a length of the guard interval, or the cyclic prefix, or the cyclic suffix, based at least in part on whether the symbols of the subset are contiguous or discontiguous within the TTI. Some examples of the method, apparatus, and non-transitory computer-readable medium described above may further include processes, features, means, or instructions for processing the control information to determine that the plurality of symbols of the TTI do not have a guard interval, or a cyclic prefix, or a cyclic suffix, based at least in part on the symbols of the subset being discontiguous within the TTI.

Some examples of the method, apparatus, and non-transitory computer-readable medium described above may further include processes, features, means, or instructions for processing the control information to determine that the plurality of symbols of the TTI have a reduced guard interval, or a reduced cyclic prefix, or a reduced cyclic suffix, for beam switching, based at least in part on the symbols of the subset being discontiguous within the TTI. Some examples of the method, apparatus, and non-transitory computer-readable medium described above may further include processes, features, means, or instructions for measuring a pilot sequence communicated between at least two symbols of the plurality of symbols; and decoding at least a subset of a plurality of beamformed transmissions based at least in the measured pilot sequence.

Some examples of the method, apparatus, and non-transitory computer-readable medium described above may further include processes, features, means, or instructions for processing the control information to determine that a second subset of the plurality of symbols are associated with a guard interval based at least in part on the symbols of the subset being discontiguous within the TTI, wherein the second subset of the plurality of symbols are not allocated to the UE.

Some examples of the method, apparatus, and non-transitory computer-readable medium described above may further include processes, features, means, or instructions for processing the control information to identify timing information associated with a beam switch; and determining a symbol location associated with the beam switch of at least one symbol of the plurality of symbols based at least in part on the timing information. In some examples of the method, apparatus, and non-transitory computer-readable medium described above, each of the plurality of symbols is associated with a downlink transmission.

Another method for wireless communication is described. The method may include determining symbol level scheduling for a plurality of symbols allocated to a plurality of UEs within a TTI; transmitting, in a control channel of the TTI, control information indicating the symbol level scheduling, that a subset of the plurality of symbols are allocated to a UE of the plurality of UEs, and whether symbols of the subset are contiguous or discontiguous within the TTI; and communicating, in accordance with the symbol level scheduling, the plurality of symbols within the TTI in a plurality of beamformed transmissions.

Another apparatus for wireless communication is described. The apparatus may include means for determining symbol level scheduling for a plurality of symbols allocated to a plurality of UEs within a TTI; means for transmitting, in a control channel of the TTI, control information indicating the symbol level scheduling, that a subset of the plurality of symbols are allocated to a UE of the plurality of UEs, and whether symbols of the subset are contiguous or discontiguous within the TTI; and means for communicating, in accordance with the symbol level scheduling, the plurality of symbols within the TTI in a plurality of beamformed transmissions.

Another apparatus for wireless communication is described. The apparatus may include a processor, memory in electronic communication with the processor, and instructions stored in the memory. The instructions may be operable to cause the processor to determine symbol level scheduling for a plurality of symbols allocated to a plurality of UEs within a TTI; transmit, in a control channel of the TTI, control information indicating the symbol level scheduling, that a subset of the plurality of symbols are allocated to a UE of the plurality of UEs, and whether symbols of the subset are contiguous or discontiguous within the TTI; and communicate, in accordance with the symbol level scheduling, the plurality of symbols within the TTI in a plurality of beamformed transmissions.

Another non-transitory computer-readable medium for wireless communication is described. The non-transitory computer-readable medium may include instructions operable to cause a processor to determine symbol level scheduling for a plurality of symbols allocated to a plurality of UEs within a TTI; transmit, in a control channel of the TTI, control information indicating the symbol level scheduling, that a subset of the plurality of symbols are allocated to a UE of the plurality of UEs, and whether symbols of the subset are contiguous or discontiguous within the TTI; and communicate, in accordance with the symbol level scheduling, the plurality of symbols within the TTI in a plurality of beamformed transmissions.

Some examples of the method, apparatus, and non-transitory computer-readable medium described above may further include processes, features, means, or instructions for transmitting second control information indicating that a second subset of the plurality of symbols are allocated to a second UE of the plurality of UEs, the second control information indicating a guard interval associated with the subset of the plurality of symbols allocated to the UE. In some examples of the method, apparatus, and non-transitory computer-readable medium described above, the second control information indicates that symbols of the second subset are contiguous or discontiguous within the TTI.

Some examples of the method, apparatus, and non-transitory computer-readable medium described above may further include processes, features, means, or instructions for determining that a first beamformed transmission allocated to the UE is via a first beam and a second beamformed transmission allocated to a second UE of the plurality of UEs is via a second beam; and determining whether to TDM schedule the first beamformed transmission and the second beamformed transmission within the TTI based at least in part on whether the first beam is orthogonal to the second beam.

Some examples of the method, apparatus, and non-transitory computer-readable medium described above may further include processes, features, means, or instructions for generating the control information to indicate the TDM schedule for the TTI. Some examples of the method, apparatus, and non-transitory computer-readable medium described above for communicating, in accordance with the symbol level scheduling, the plurality of symbols within the TTI in the plurality of beamformed transmissions may further include processes, features, means, or instructions for communicating the plurality of beamformed transmissions based at least in part on the TDM schedule.

Some examples of the method, apparatus, and non-transitory computer-readable medium described above for communicating the plurality of beamformed transmissions based at least in part on the TDM schedule may further include processes, features, means, or instructions for interleaving, in the TTI, the subset of the plurality of symbols allocated to the UE with a second subset of the plurality of symbols allocated to a second UE of the plurality of UEs.

Some examples of the method, apparatus, and non-transitory computer-readable medium described above may further include processes, features, means, or instructions for determining that a first beamformed transmission allocated to the UE is via a first beam and a second beamformed transmission allocated to the second UE of the plurality of UEs is via a second beam.

Some examples of the method, apparatus, and non-transitory computer-readable medium described above for generating the control information to indicate the TDM schedule may further include processes, features, means, or instructions for unequally allocating the plurality of symbols between a first UE of the plurality of UEs and a second UE of the plurality of UEs. Some examples of the method, apparatus, and non-transitory computer-readable medium described above for generating the control information to indicate the TDM schedule may further include processes, features, means, or instructions for unequally allocating a symbol length or duration within the TTI to the first UE of the plurality of UEs and the second UE of the plurality of UEs.

Some examples of the method, apparatus, and non-transitory computer-readable medium described above may further include processes, features, means, or instructions for determining a length of a guard interval, or a cyclic prefix, or a cyclic suffix, associated with each symbol of the plurality of symbols of the TTI. Some examples of the method, apparatus, and non-transitory computer-readable medium described above for communicating, in accordance with the symbol level scheduling, the plurality of symbols within the TTI may further include processes, features, means, or instructions for communicating the plurality of symbols within the TTI based at least in part on the determined length.

Some examples of the method, apparatus, and non-transitory computer-readable medium described above may further include processes, features, means, or instructions for performing a beam switch from a first beam to a second beam, wherein the control information comprises timing information associated with the beam switch; and determining a length of a guard interval between a first symbol of the plurality of symbols prior to the beam switch and a second symbol of the plurality of symbols after the beam switch. Some examples of the method, apparatus, and non-transitory computer-readable medium described above for communicating, in accordance with the symbol level scheduling, the plurality of symbols within the TTI in the plurality of beamformed transmissions may further include processes, features, means, or instructions for communicating, based at least in part on the determined length of the guard interval, a first beamformed transmission of the plurality of beamformed transmissions to communicate the first symbol using the first beam and a second beamformed transmission of the plurality of beamformed transmissions to communicate the second symbol using the second beam.

Some examples of the method, apparatus, and non-transitory computer-readable medium described above may further include processes, features, means, or instructions for communicating a pilot sequence between at least two symbols of the plurality of symbols of the TTI. In some examples of the method, apparatus, and non-transitory computer-readable medium described above, each of the plurality of beamformed transmissions is a downlink transmission or an uplink transmission.

BRIEF DESCRIPTION OF THE DRAWINGS

FIGS. 6A and 6B illustrates an example of a configuration that supports overhead reduction in mmW systems in accordance with aspects of the present disclosure.

DETAILED DESCRIPTION

Figure 1:
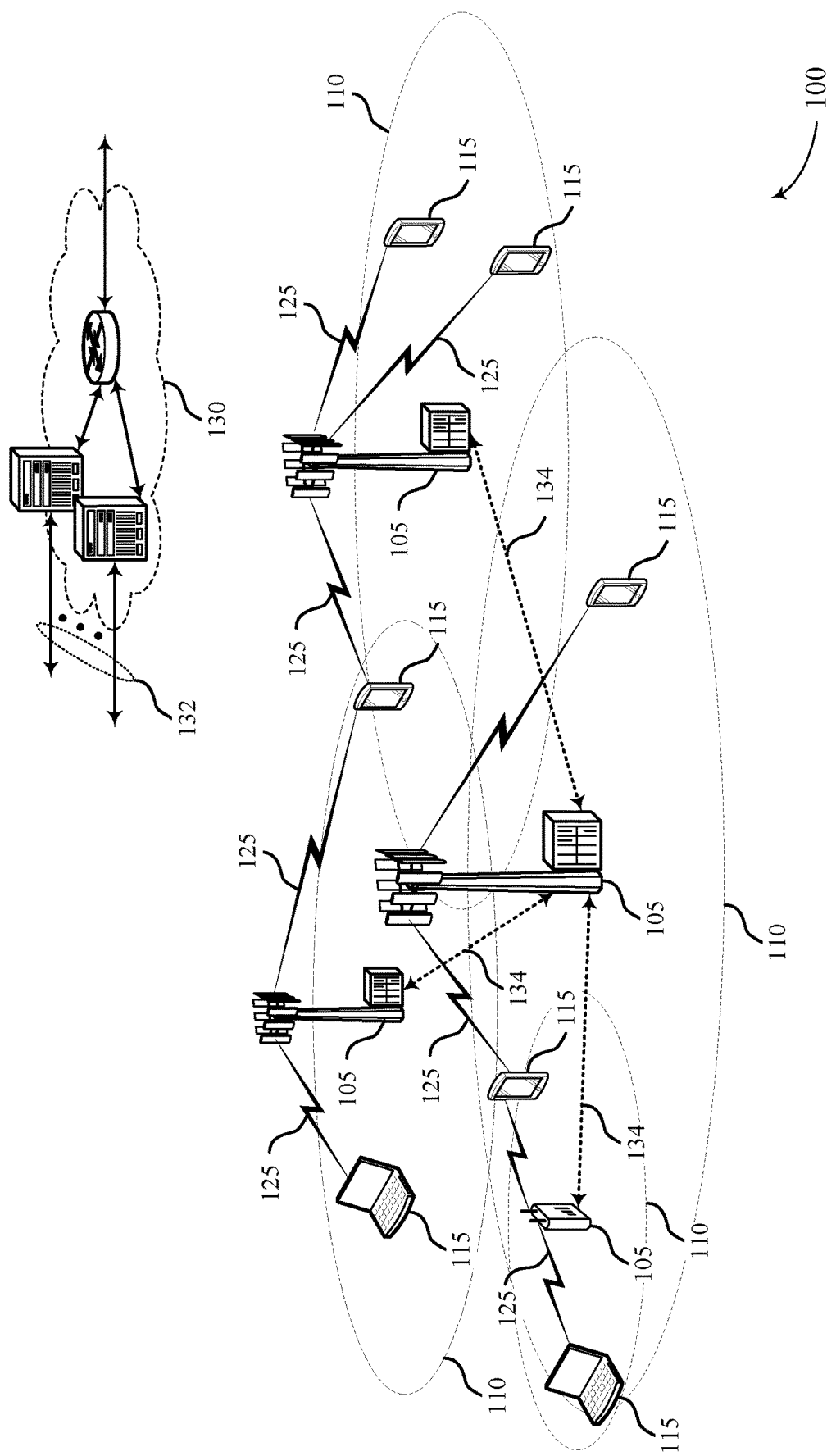
FIG. 1 illustrates an example of a system for wireless communication that supports overhead reduction in mmW systems in accordance with aspects of the present disclosure.

The described techniques relate to improved methods, systems, devices, or apparatuses that support symbol level time division multiplexing (TDM) for guard interval and cyclic prefix overhead reduction in millimeter wave (mmW) systems. A base station may allocate symbols within a same transmission time interval (TTI) to different user equipments (UEs). The base station may communicate the symbols within the TTI to the different UEs in a set of beamformed transmissions in a manner that decreases overhead by reducing a length of, or eliminating, a guard interval, cyclic prefix, or cyclic suffix between each symbol of the TTI, without detrimentally increasing inter-symbol interference (ISI).

In an example, a base station may determine symbol level scheduling of a TTI for multiple UEs that allocates one or more symbols (e.g., OFDM symbols) of the TTI to a respective UE of the multiple UEs. In some cases, the symbol level scheduling may indicate that a contiguous set of symbols are allocated to a UE. In other cases, the symbol level scheduling may indicate that a discontiguous set of symbols are allocated to a UE.

Conventional systems communicate symbols in omnidirectional or isotropic transmissions, and do not allocate symbols within a same TTI to different UEs because the scheduling complexity is higher and no identified advantage exists for supporting such scheduling.

The techniques described herein may utilize beamforming or highly directional transmissions which reduce or eliminate ISI between different beams, permitting a base station to schedule different UEs within a same TTI on a symbol by symbol basis. In beamforming, a beamformed transmission is communicated in a particular direction to a first UE, and a second UE that is not located in that direction is unlikely to receive, or experience interference due to, that beamformed transmission. A base station may thus select two or more UEs that are at different locations, and shorten a length of, or eliminate, a guard interval, cyclic prefix, or cyclic suffix, without having ISI detrimentally impact throughput.

After determining the symbol level scheduling, the base station may transmit control information indicating the scheduling to the UEs. For example, a base station may transmit downlink control information (DCI) on a physical downlink control channel (PDCCH) of a TTI. To reduce overhead, the DCI may indicate which symbols are respectively allocated to each UE. The DCI may explicitly indicate the symbol length, or guard interval, cyclic prefix, or cyclic suffix length for the symbol, or the UE may implicitly determine the symbol length, or guard interval, cyclic prefix, or cyclic suffix length for the symbol from the DCI. In some examples, the DCI may specify a length of guard interval, cyclic prefix, or cyclic suffix between some or all symbols of the TTI. For example, the DCI may indicate that there is no guard interval between symbols, or a length of a guard interval or cyclic prefix between symbols. In some cases, the guard interval, cyclic prefix, or cyclic suffix has the same length in time as a portion of or an entire symbol period.

In some examples, the UE may implicitly determine a length of guard interval, cyclic prefix, or cyclic suffix between some or all symbols of the TTI. For instance, the DCI may indicate that a discontiguous set of symbols (e.g., every other symbol) is allocated to a particular UE, and that UE may infer that there is no guard interval, cyclic prefix, or cyclic suffix, or that the guard interval, cyclic prefix, or cyclic suffix is a particular length.

In some examples, the DCI may be UE-specific. The base station may scramble DCI with an identifier of the UE (e.g., a radio network temporary identifier (RNTI) assigned to the UE by the base station). A UE may decode its DCI to determine a subset of symbols of a TTI allocated to it and determine symbol level scheduling for the subset of symbols. For example, the UE may monitor a set of one or more candidate locations in a search space of a control channel of the TTI and attempt to, using its identifier, descramble and decode DCI from the respective candidate locations. If able to successfully descramble and decode DCI from a particular candidate location using its identifier, the UE determines that the DCI is for the UE. Otherwise, the UE checks the next candidate location until all candidates' locations have been checked for UE-specific DCI.

Whether the length is implicitly determined or explicitly signaled, the UE may process its DCI to determine one or more symbols of a TTI allocated to the UE, and a length, if any, of the guard interval, cyclic prefix, or cyclic suffix between each symbol of the TTI. The base station and UEs may then communicate during the TTI using a number of beamformed transmissions having a spacing between each symbol of the TTI based on the determined length. In some examples, a symbol of a TTI may be communicated in a downlink beamformed transmission from the base station to a UE, or in an uplink beamformed transmission from a UE to the base station. The base station may thus use the DCI to indicate the symbol level scheduling to multiple UEs and the length of the guard interval, cyclic prefix, or cyclic suffix on a TTI by TTI basis. Beneficially, the techniques described herein may provide for symbol level scheduling to different UEs within a same TTI, and increase throughput by reducing or eliminating guard interval, cyclic prefix, or cyclic suffix without having ISI detrimentally impact throughput.

A guard interval may be a period of time between symbols in which no transmission occurs. For example, a base station may insert a guard interval before each symbol, and wait for the guard interval to lapse before transmission of subsequent symbols to a UE. A cyclic prefix or cyclic suffix may also be a period of time between symbols that functions as a buffer to protect from ISI. However, in the cyclic prefix case, the base station copies data from an end of a symbol to the beginning of the same symbol, and in the cyclic suffix case, copies data from the beginning of a symbol to the end of the same symbol. That is, the base station generates a cyclic prefix or a cyclic suffix so that each symbol is preceded by or ends with a copy of the end portion or beginning portion of that same symbol.

In addition, the base station may support a normal length cyclic prefix and an extended length cyclic prefix. Use of the guard interval, cyclic prefix, or cyclic suffix may assist the UE to equalize and demodulate each block separately, and some systems may mandate a cyclic prefix for each block or OFDM symbol. Although conventional techniques reduce ISI, conventional techniques add overhead and decrease throughput. For example, a Golay sequence transmission during intervals for single-carrier quadrature amplitude modulation (SC-QAM) (SC-PHY), results in additional overhead (e.g., 64/512=12.5%). For example, a packet may have duration of 512 units of time, 64 out of the 512 units of time may be used for the Golay sequence transmission which doesn't carry any payload, which results in overhead being 12.5% of the total packet size. In another example, OFDM-PHY may result in a cyclic prefix overhead (e.g., 128/(512+128)=20%). Here, the OFDM symbol may include the duration of a cyclic prefix and a payload carrying portion of the symbol. That is, the cyclic prefix may use 128 units of time and the symbol may use 512 units of time; as such, the cyclic prefix may be overhead that is 20% of the total symbol size.

According to the principles of this disclosure, a base station may allocate symbols of a transmission time interval (TTI) to multiple UEs, and communicate the symbols using beamformed transmission to reduce ISI and reduce overhead by shortening a length of, or eliminating, a guard interval, cyclic prefix, or cyclic suffix between symbols of the TTI. A base station may determine symbol level scheduling for a plurality of symbols allocated to a number of UEs within a TTI. The base station may then transmit, in a control channel of the TTI, control information indicating the symbol level scheduling to the UEs, and communicate, in accordance with the symbol level scheduling, the plurality of symbols within the TTI in a plurality of beamformed transmissions.

The UEs may receive the control information in the control channel of the TTI from the base station. After receiving the control information, the UEs may process the control information to determine respective subsets of a plurality of symbols of the TTI allocated to the UEs and symbol level scheduling for the subset of the plurality of symbols within the TTI. Each UE may receive an allocated subset of the plurality of symbols based on the control information.

Aspects of the disclosure are initially described in the context of a wireless communications system. Exemplary UEs and base stations (e.g., next generation NodeBs (gNBs)), systems, configurations, and process flow that support symbol level TDM for overhead reduction in mmW systems are then described. Aspects of the disclosure are further illustrated by and described with reference to apparatus diagrams, system diagrams, and flowcharts that relate to symbol level TDM for overhead reduction in mmW systems.

FIG. 1 illustrates an example of a system 100 for wireless communication that supports overhead reduction in mmW systems in accordance with aspects of the present disclosure. The system 100 includes base stations 105, UEs 115, and a core network 130. In some examples, the system 100 may be a Long Term Evolution (LTE) network, an LTE-Advanced (LTE-A) network, or a New Radio (NR) network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The system 100 may also operate in an extremely high frequency (EHF) region of the spectrum (e.g., from 30 GHz to 300 GHz), also known as the millimeter band. In some examples, the system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the system 100, and may be referred to as a transmission time interval (TTI). In other cases, a smallest scheduling unit of the system 100 may be shorter than a subframe or may be dynamically selected (e.g., in bursts of shortened TTIs (sTTIs) or in selected component carriers using sTTIs).

A base station 105 may perform a RRC connection procedure including a beam sweep procedure to allow the base station 105 and UEs 115 to identify appropriate beams for mmW communications. During the RRC connection procedure, UEs 115 may also receive system information from the base station 105, which the UEs 115 may use to access a wireless network (e.g., through the base station 105). The UEs 115 may also receive timing information to synchronize with the base station 105. Synchronization (e.g., for cell acquisition) may be performed using synchronization signals or channels transmitted by a synchronization source (e.g., the base station 105). A base station 105 may transmit synchronization signals including discovery reference signals. Synchronization signals may include primary synchronization signals (PSSs) or secondary synchronization signals (SSSs). The UEs 115 attempting to access a wireless network may perform an initial cell search by detecting a PSS from the base station 105. The PSS may enable synchronization of slot timing or symbol timing. The UEs 115 may then receive an SSS.

The SSS may enable radio frame synchronization, and may provide a cell ID value, which may be combined with the physical layer identity value to form the PCID, which identifies the cell. The SSS may also enable detection of a duplexing mode (e.g., time division duplexing (TDD) or frequency division duplexing (FDD)). An SSS may be used to acquire other broadcast information (e.g., system bandwidth). In some cases, the base station 105 may provide the other broadcast information for the UEs 115 in the physical broadcast channel (PBCH). As such, the PBCH may be used to acquire additional broadcast information needed for acquisition (e.g., system bandwidth, radio frame index/number). In some examples, the physical broadcast channels may be multiplexed on a carrier according to various techniques. A physical broadcast control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical broadcast channel may be distributed between different control regions in a cascaded manner (e.g., between a common control region or common search space and one or more UE-specific control regions or UE-specific search spaces).

In conventional systems, overlap between reception of different symbols may result in ISI which may degrade the ability of a UE to successfully receive and decode each of the symbols. To decrease the effects of ISI, conventional wireless communication systems may provide a guard interval, or use a cyclic prefix or a cyclic suffix between each of the symbols. A guard period may be a period where no transmission occurs. The cyclic prefix or the cyclic suffix may be a cyclic repetition of a block of symbols in a head or a tail of the block. Thus, the addition of guard intervals, cyclic prefix, and cyclic suffix in conventional systems may add overhead and impact throughput. For instance, guard interval may be overhead that separates the symbols in time, but reduces the number of symbols that can be transmitted within a time interval. Additionally, because conventional systems generally communicate symbols in omnidirectional transmissions, they do not allocate symbols within a same TTI to different UEs.

The described techniques relate to improved methods, systems, devices, or apparatuses that support symbol level TDM for guard interval and cyclic prefix overhead reduction in mmW systems supporting directional transmissions. In mmW systems, a beamformed transmission communicated in a particular direction to a first UE is not received or experienced by a second UE that is not located in that direction. The techniques described herein may utilize beamforming in mmW systems to reduce or eliminate ISI between different beams. More specifically, base station 105 may allocate symbols within a same TTI to different UEs 115, and may communicate the symbols in a set of beamformed transmissions in a manner that decreases overhead by reducing a length of, or eliminating, a guard interval, cyclic prefix, or cyclic suffix between each symbol of the TTI, without detrimentally increasing ISI.

In some cases, the base station 105 may determine symbol level scheduling for a plurality of symbols allocated to a plurality of UEs 115 within a TTI, and transmit, in a control channel of the TTI, control information indicating the symbol level scheduling. In some cases, the control information may indicate that a subset of the plurality of symbols are allocated to a UE 115 of the plurality of UEs 115, and whether symbols of the subset are contiguous or discontiguous within the TTI. Symbol level time division multiplexing of a set of beamformed transmissions to a set of UEs 115 may assist in reducing or removing guard interval overhead in SC-QAM systems. In some examples of SC-QAM based modulation schemes, a block of symbols for transmission may be separated by a guard interval (e.g., zeros) or pilots (PI). In OFDM systems, symbol level TDM may help attain better signal to noise ratio (SNR) at the UEs 115 and tolerate higher ISI. In addition, in SC-QAM with PI, symbol level TDM may also acquire better SNR for the UEs 115 and improve channel estimation while tolerating higher ISI.

The base station 105 may communicate, in accordance with the symbol level scheduling, the plurality of symbols within the TTI in a plurality of beamformed transmissions. In the case that the base station 105 is transmitting control information to multiple UEs 115, the base station 105 may generate first control information indicating that a first subset of the plurality of symbols are allocated to a first UE 115, and generate a second control information indicating that a second subset of the plurality of symbols are allocated to a second UE 115. The first control information may indicate that symbols of the first subset are contiguous or discontiguous in the TTI and the second control information may indicate that symbols of the second subset are contiguous or discontiguous in the TTI. In some examples, the base station 105 may generate control information to indicate a TDM schedule for the TTI, and communicate, in accordance with the symbol level scheduling, the plurality of symbols within the TTI based on the TDM schedule.

The UEs 115 may receive the control information in the control channel of the TTI from the base station 105. After receiving the control information, the UEs 115 may process the control information to determine respective subsets of a plurality of symbols of the TTI allocated to the UEs 115 and symbol level scheduling for the subsets of the plurality of symbols within the TTI. The UEs 115 may determine whether symbols of the subsets are contiguous or discontiguous within the TTI. The UEs 115 may receive the subset of the plurality of symbols during the TTI based on the control information. Since transmissions between the base station 105 and the UEs 115 are directional or beamformed, the base station 105 may provide symbol level scheduling for multiple UEs 115 in the same TTI, in a manner that increases throughput by reducing or eliminating overhead between symbols without detrimentally increasing ISI.

Figure 2:
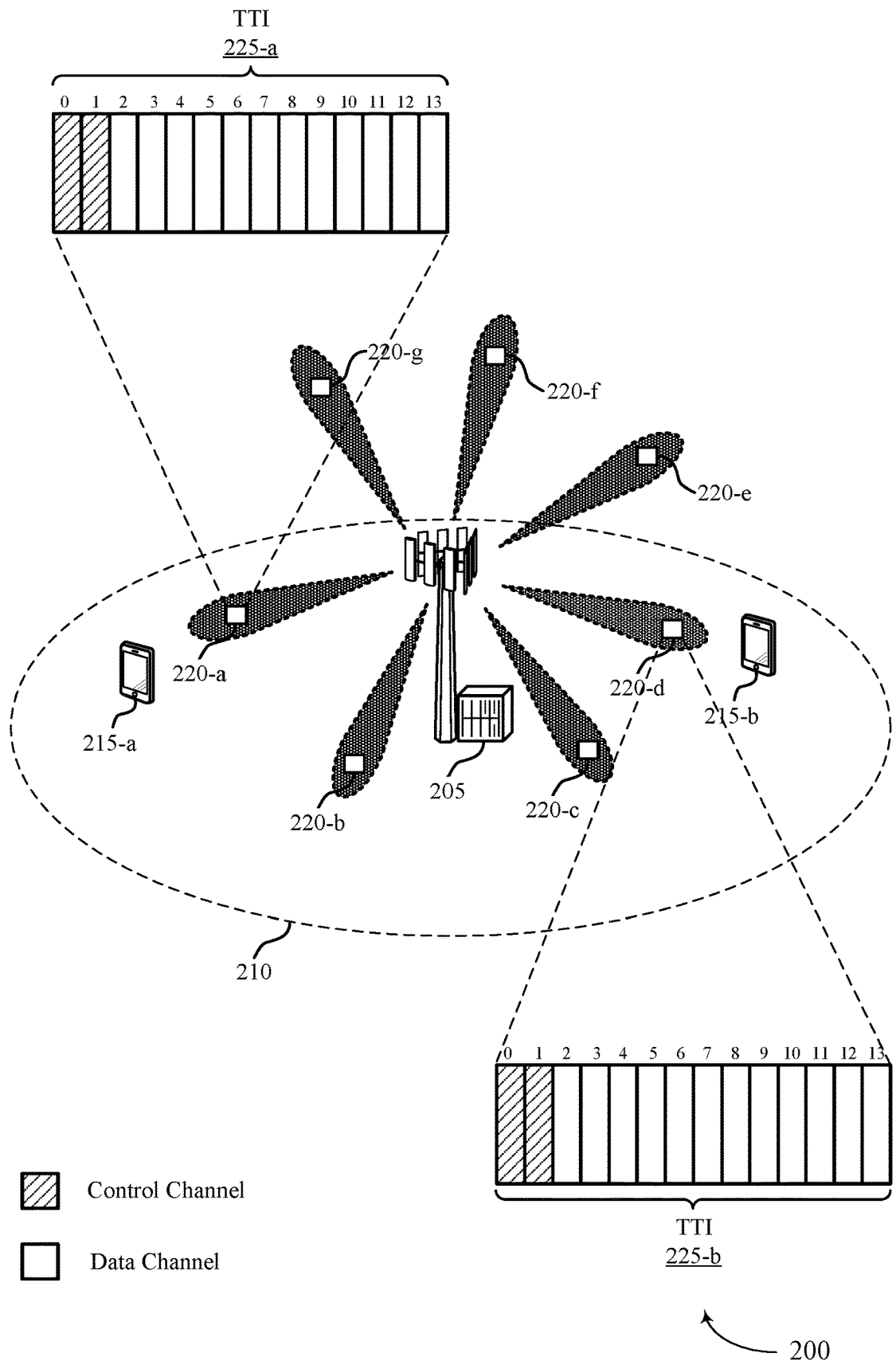
FIG. 2 illustrates an example of a system that supports overhead reduction in mmW systems in accordance with aspects of the present disclosure.

FIG. 2 illustrates an example of a system 200 that supports overhead reduction in mmW systems in accordance with various aspects of the present disclosure. In some examples, the system 200 may implement aspects of the system 100. The system 200 may include a base station 205, a UE 215-a, and UE 215-b, which may be examples of the corresponding devices described with reference to FIG. 1. The system 200 may also operate according to a radio access technology (RAT) such as a 5G New Radio (NR) RAT, although techniques described herein may be applied to any RAT and to systems that may concurrently use two or more different RATs that support beamformed transmissions. In some cases, the system 200 may support symbol level TDM for guard interval, cyclic prefix, and cyclic suffix overhead reduction in mmW systems.

An example frame structure in mmW systems may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\,T_s$. Each frame may include 10 subframes numbered from 0 to 9, and each subframe may have a duration of 1 ms. A subframe may be further divided into 2 slots each having a duration of 0.5 ms, and each slot may contain 14 modulation symbol periods (e.g., OFDM symbols). In some cases, a subframe or a slot may be a scheduling unit of the system 200. A transmission time interval (TTI) may include one or more subframes, slots, frames, or the like.

The base station 205 may perform a RRC procedure (e.g., cell acquisition procedure, random access procedure, RRC connection procedure, RRC configuration procedure) with the UE 215-a and the UE 215-b. As part of the RRC procedure, the base station 205 may schedule and allocate resources for both the UE 215-a and the UE 215-b. The schedule may include information indicating to the UE 215-a and the UE 215-b scheduled TTIs and symbols allocated for each of the UE 215-a and the UE 215-b.

The base station 205 may be configured with multiple antennas, which may be used for directional or beamformed transmissions (e.g., beamformed transmissions 220-a through 220-g). In some examples, the RRC procedure may include a beam sweep procedure. As illustrated, the base station 205 may transmit a number of beamformed transmissions 220-a through 220-g in different directions within a coverage area 210. The base station 205 may indicate the allocated resources for the UE 215-a or the UE 215-b, or both in control information. For example, the base station 205 may indicate the allocated resources in a downlink control information (DCI) transmitted to the UE 215-a or the UE 215-b, or both on a broadcast channel e.g., physical downlink control channel (PDCCH), using the beamformed transmissions 220-a through 220-g.

The DCI may indicate which one or more symbols of a TTI are allocated to the UE 215-a or the UE 215-b and additional information about the symbol. For instance, the additional information may include a length of the symbol and a length of a guard interval, a cyclic prefix, or a cyclic suffix associated with the symbol. Alternatively or additionally, the additional information may indicate presence or absence of a guard interval, a cyclic prefix, or a cyclic suffix associated with the symbol. Symbols associated with a PDCCH of a TTI and up to all transmissions before the UE 215-*a* or the UE 215-*b* obtain the guard interval, the cyclic prefix, or the cyclic suffix information for the TTI may follow a fixed format. For example, DCI transmissions of DCI in the PDCCH of a TTI may be in the fixed format, and the DCI may indicate the format. In some examples, symbols associated with the PDCCH may use a fixed cyclic prefix size and the size indicated in the DCI may apply to symbols in a data channel (e.g., PDSCH) of the TTI (or a subsequent TTI). In an example, some transmissions (e.g. pilots to estimate cyclic prefix, PDCCH, pilots, synchronization channels such as PSS, SSS, PBCH, system information block (SIBs), or the like) in the control channel of the TTI may have fixed cyclic prefix sizes between each symbol of the control channel. Other symbols of the TTI (e.g., PDSCH, PDCCH on following subframes) may have dynamic cyclic prefix sizes. In some examples, a guard interval size may be dynamic based on a characteristic of a channel that the base station 205 is communicating with the UE 215-*a* or the UE 215-*b* (e.g., line of sight (LOS), non-line of sight (NLOS)).

In some cases, the control information (e.g., DCI) may include a bit sequence, and the UE 215-*a* and the UE 215-*b* may identify whether the base station 205 scheduled and allocated resources at a symbol-level or a slot-level configuration based on the bit sequence. For example, the control information may be a bit sequence indicating positions of allocated resources (e.g., symbols) in a TTI. In some examples, the bit sequence may be defined by a single or multi-bit field (e.g., 2-bit DCI field).

The TTI 225 may be associated with a bandwidth. The bandwidth may include a number of subbands and component carriers or subcarriers within each subband. For example, the bandwidth may correspond to one or more resource blocks (RBs).

The UE 215-*a* may receive control information from the base station 205 via beamformed transmission 220-*a* within the TTI 225. In some examples, the control information may be received in a control channel of a TTI 225. The TTI 225 may include a number of symbols (e.g., symbols 0 through 13). In some examples, a first subset of symbols of the TTI 225 may be a control channel assigned for transmission of control information, and a second subset of symbols of the TTI may be a data channel for transmission of data.

For example, symbol 0 and symbol 1 of the TTI 225 may be a control channel and assigned for the UE 215-*a* to receive the control information from the base station 205. Symbols 2 to 13 may be a data channel of the TTI. During symbol 0 and symbol 1, the UE 215-*a* may receive and process the control information. For example, the UE 215-*a* may receive and decode a DCI transmitted on a PDCCH via beamformed transmission 220-*a*. In some examples, the DCI may be UE-specific. The UE 215-*a* may decode its DCI to determine a subset of symbols of a TTI allocated to it and determine symbol level scheduling for the subset of symbols, and not a DCI of a different UE (e.g., the UE 215-*b*). In some cases, the DCI may be UE-specific, and each UE may search one or more candidate locations within a search space of a control channel of a TTI for its DCI.

After decoding the DCI, the UE 215-*a* may determine that a set or a subset of symbols in the TTI 225 are allocated to the UE 215-*a*. For example, the decoded DCI may indicate to the UE 215-*a* that a subset of symbols are allocated for receiving downlink beamformed transmissions (e.g., the allocated subset of symbols) from the base station 205.

The UE 215-*b* may also receive control information from the base station 205 via beamformed transmission 220-*d* in the TTI 225. In some examples, the control information may be received during the same TTI 225 as UE 215-*a* received its control information. Since the TTI 225 is same for both the UE 215-*a* and the UE 215-*b*, the UE 215-*b* may also receive and process the control information during symbol 0 and symbol 1. For example, the UE 215-*b* may receive and decode a DCI transmitted on a PDCCH via beamformed transmission 220-*d*, and the DCI may be UE-specific. After decoding the DCI, the UE 215-*b* may determine a subset of symbols in the TTI 225 allocated to it for receiving downlink transmission, e.g., downlink beamformed transmissions from the base station 205.

In some cases, the base station 205 may perform slot level time division multiplexing beamformed transmissions in different beam directions to the UE 215-*a* and the UE 215-*b*. For example, the base station 205 may communicate with the UE 215-*a* during a first slot of a TTI using a set of beamformed transmissions sent in a first direction, and with the UE 215-*b* during a second slot of the TTI using a set of beamformed transmissions sent in a second direction. In some cases, each slot may be a contiguous group of symbols of the TTI 225. As a result, the UE 215-*a* and the UE 215-*b* may determine from the control information scheduling and allocation of resources for a set of symbols in a slot. The base station 205 may select to allocate symbols of the TTI 225 to the UEs 215-*a*, 215-*b* because any beamformed transmission to the UEs 215-*a*, 215-*b* would be in different directions, and hence unlikely to experience ISI.

Figure 3:
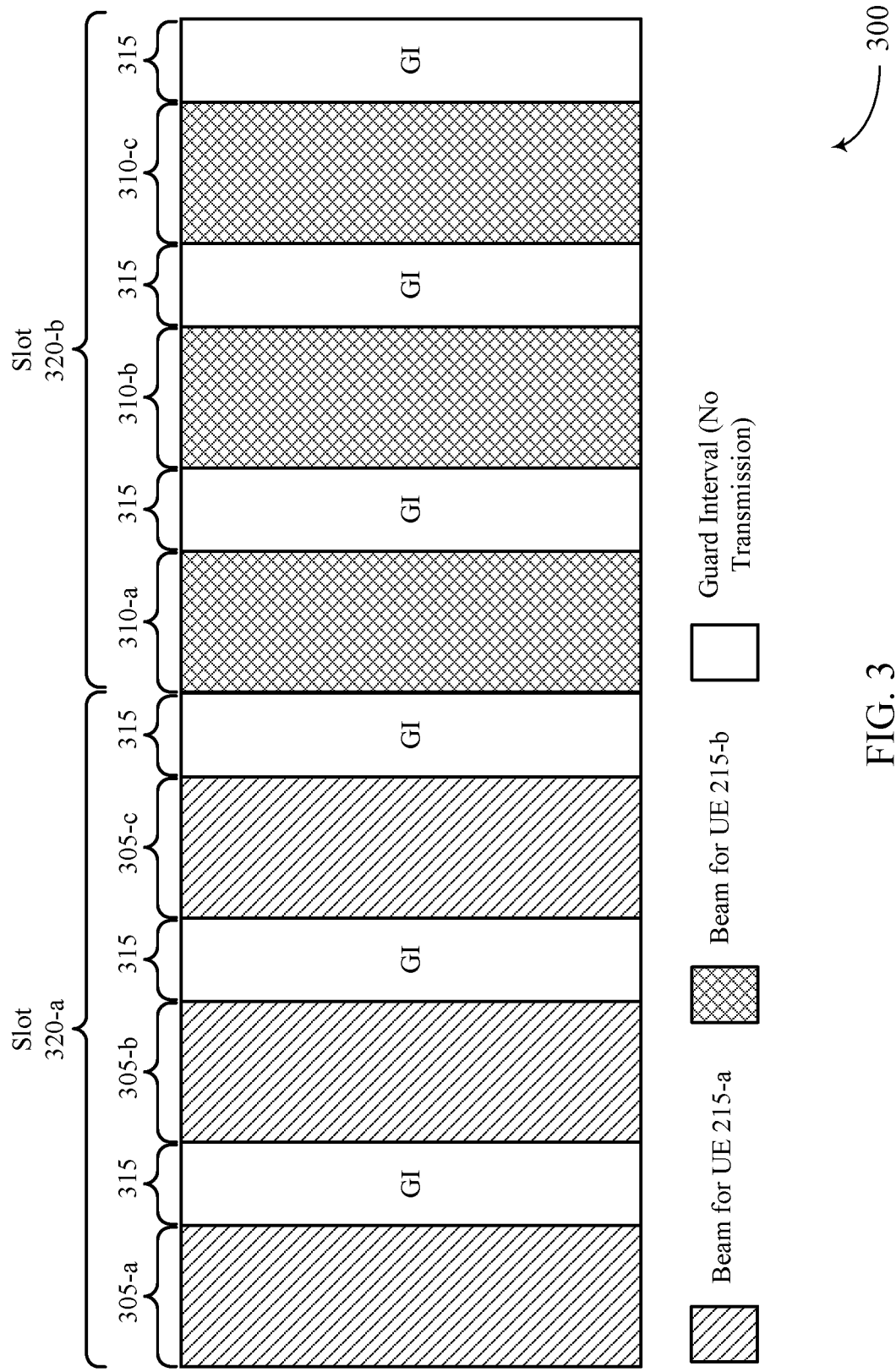
FIG. 3 illustrates an example of a configuration that supports overhead reduction in mmW systems in accordance with aspects of the present disclosure.

FIG. 3 illustrates an example of a configuration 300 that supports overhead reduction in mmW systems in accordance with various aspects of the present disclosure. In some examples, configuration 300 may implement aspects of the system 100 and 200. The base station 205 may schedule and allocate resources for the UE 215-*a* and the UE 215-*b* at a slot level. The configuration 300 may include a first slot 320-*a* and a second slot 320-*b*. In some examples, the first slot 320-*a* and the second slot 320-*b* may be part of the TTI 225. Although the configuration 300 shows three symbols for each slot 320, it should be understood that the configuration 300 may include fourteen symbols for each slot 320, in accordance with slot structure in mmW systems. For example, configuration 300 may be a portion of the TTI 225 as illustrated in FIG. 2.

In some examples, the base station 205 may schedule a guard interval between each symbol, and wait for the guard interval to lapse before transmission of subsequent symbols. Hence, the guard interval may be a period of time between each symbol in which no transmission occurs, which may decrease ISI in the system 200. Both the first slot 320-*a* and the second slot 320-*b* may include guard interval 315 between each symbol. For example, downlink symbols 305-*a* through 305-*c* may be separated by guard intervals 315, and downlink symbols 310-*a* through 310-*c* may also be separated by the guard intervals 315. There may be a small guard interval between transmission to the UE 215-*a* or the UE 215-*b* to allow for beam switching at the base station 205.

In the slot level case, the base station 205 may communicate with the UE 215-*a* during the first slot 320-*a*, and the UE 215-*b* during the second slot 320-*b*. The base station 205 may multiplex beamformed transmissions in different beam directions in the same TTI 225 to communicate with the UE 215-*a* and the UE 215-*b*. The base station 205 may transmit a first symbol 305-*a* as a first beamformed transmission using a first beam that is transmitted in a first direction, a second symbol 305-*b* as a second beamformed transmission using the first beam that is transmitted in the first direction, and the third symbol 305-*c* as a third beamformed transmission using the first beam that is transmitted in the first direction. A guard interval 315 may occur between each symbol. When transmitting to the second UE 215-*b*, the base station 205 may transmit a fourth symbol 310-*a* as a fourth beamformed transmission using a second beam that is transmitted in a second direction, a fifth symbol 310-*b* as a fifth beamformed transmission using the second beam that is transmitted in the second direction, and the sixth symbol 310-*c* as a sixth beamformed transmission using the second beam that is transmitted in the second direction. A guard interval 315 may occur between each symbol.

By having the base station 205 apply slot level scheduling and allocating of resources, the base station 205 may experience benefits related to existing systems. For example, by transmitting beamformed transmissions using beams communicated in different directions, a length of the guard interval (or cyclic suffix or cyclic prefix) may be reduced or eliminated to reduce overhead without increasing ISI. The base station 205 may additionally or alternatively exploit features of mmW systems that existing systems (e.g., LTE and Wi-Fi systems) failed to provide. For example, even with adjacent symbols being allocated to different UEs, ISI mitigation in existing systems may not be achieved because the transmission of the symbols is omnidirectional or isotropic, and because beamforming decreases or eliminates ISI, the base station 205 can provide symbol level scheduling that allocates symbols to different UEs 215 within the same TTI.

In some examples, the base station 205 may utilize the guard intervals 315 to allow for beam switching. In the case of non-contiguous scheduling, the UE 215-*a* and the UE 215-*b* may process the control information to determine that the plurality of symbols of the TTI have a reduced guard interval for beam switching. For example, there may be a small guard interval between a transmission to the UE 215-*a* and to the UE 215-*b* to allow for beam switching at the base station 205. This may imply a small overhead for symbol level TDM. For example, the base station 205 may transmit control information that includes timing information associated with a beam switch from the UE 215-*a* to the UE 215-*b*. The UE 215-*a* or the UE 215-*b* may receive and decode the control information to identify a duration (e.g., index or position of a symbol within the TTI) associated with the beam switch based on the timing information and the scheduling information carried in the control information. For example, an index or position of a symbol within a TTI may be determined based on scheduling information indicated in the DCI.

The UE 215-*b* may process the control information to identify the timing information associated with the beam switch, and determine a symbol location (e.g., index or position of a symbol within the TTI) of the plurality of symbols associated with the beam switch based on the timing information and symbol level scheduling. The symbol location may identify a symbol period of the TTI that occurs immediately prior to the beam switch, immediately after the beam switch, or the like, or any combination thereof. The UE 215-*b* may determine a length of a guard interval between symbols in which the beam switch occurs. In an example, the base station 205 may determine a length of the guard interval 315 between the downlink symbol 305-*c* that occurs prior to the beam switch and the downlink symbol 310-*a* that occurs after the beam switch, and may generate the DCI to implicitly or explicitly indicate the length. In an example, a beam switch may be associated with at least a set amount of time corresponding tuning from a first beam to a second beam, and the base station 205 may determine the length of the guard interval 315 to enable the tuning to occur. In another example, the DCI may indicate a beam switch, and the UE 215-*b* may store a value for the length of the guard interval 315 between the symbols in which the beam switch occurs.

The base station 205 may communicate, based on the determined length of the guard interval 315, a first beamformed transmission 220-*a* to communicate the downlink symbol 305-*c* using a first beam prior to the beam switch and a beamformed transmission 220-*b* to communicate the downlink symbol 310-*a* using a different beam. The UE 215-*a* may receive a third symbol 305-*c* communicated in a first beamformed transmission using a first beam prior to the beam switch, and the UE 215-*a* may receive a fourth symbol 310-*a* communicated in a second beamformed transmission using the different beam after the beam switch that occurred during the guard interval 315 between symbols 305-*c* and 310-*a*.

With reference to FIG. 2, since the base station 205 may be configured with directional or beamformed transmissions, the base station 205 may schedule and allocate resources at a symbol level. That is, the base station 205 may perform symbol level time division multiplexing beamformed transmissions to different UEs 215-*a*, 215-*b* in different beam directions. As a result, the base station 205 may communicate with both the UE 215-*a* and the UE 215-*b* during a same TTI.

Figure 4A:
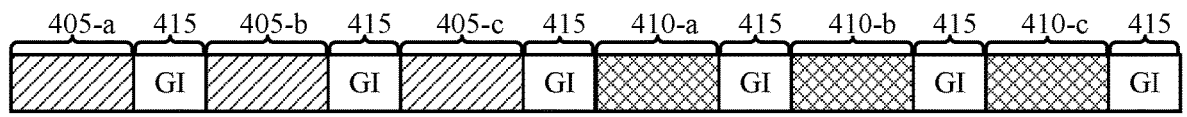
FIGS. 4A through 4E illustrates an example of a configuration that supports overhead reduction in mmW systems in accordance with aspects of the present disclosure.

FIG. 4A illustrates an example of a configuration 400-*a* that supports overhead reduction in mmW systems in accordance with various aspects of the present disclosure. Here, the base station 205 may provide slot level TDM for multiplexing between the UE 215-*a* and the UE 215-*b* in different beam directions (e.g., beamformed transmission 220-*a* and beamformed transmission 220-*d*). In the example configuration 400-*a*, the UE 215-*a* may determine a set of symbols in a TTI allocated to it based on received control information. For example, the UE 215-*a* may determine that downlink symbols 405-*a* through 405-*c* are allocated to UE 215-*a* based on a field or other indication carried in a DCI transmitted from the base station 205. In an example, the PDCCH may transport a DCI that indicates slot level TDM scheduling to the UE 215-*a* and the UE 215-*b*. In some examples, the DCI may indicate a plurality of symbols associated with a slot level TDM scheduling for a TTI.

The base station 205 may transmit data to the UE 215-*a* on downlink symbols 405-*a* through 405-*c* via a set of beamformed transmissions 220-*a*. In some cases, each downlink symbol 405 may be separated by a guard interval 415, in which no transmission occurs. In some examples, the downlink symbols 405-*a* through 405-*c* may correspond to a first slot.

The UE 215-*b* may additionally or alternatively determine a set of symbols in a TTI allocated to it based on received control information. For example, the UE 215-*b* may determine that downlink symbols 410-*a* through 410-*c* are allocated for data transmission. The base station 205 may transmit data to the UE 215-*b* on downlink symbols 410-*a* through 410-*c* via a set of beamformed transmissions 220-*d*. Additionally, each downlink symbol 410 may be separated by a guard interval 415. In some examples, the downlink symbols 410-*a* through 410-*c* may correspond to a second slot different from the first slot. As such, in the slot level scenario, the base station 205 may only communicate with a single UE during a slot.

Figure 4B:
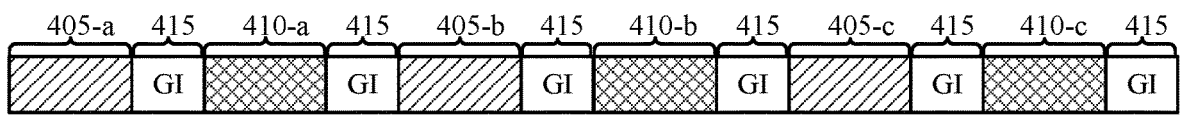

FIG. 4B illustrates an example of a configuration 400-*b* that supports overhead reduction in mmW systems in accordance with various aspects of the present disclosure. Here, the base station 205 may provide symbol level time division multiplexing of symbols allocated to the UE 215-*a* and the UE 215-*b* and communicate the symbols in beamformed transmission using beams directed in different directions (e.g., beamformed transmission 220-*a* and beamformed transmission 220-*d*). In the example configuration 400-*b*, the UE 215-*a* may determine a subset of symbols in a TTI allocated to it based on received control information. The subset of symbols may be contiguous or non-contiguous in the TTI. For example, the UE 215-*a* may determine that a third, fifth, and seventh downlink symbol (i.e., downlink symbols 405-*a* through 405-*c*) of a TTI are allocated for data transmission (e.g., a set of non-contiguous symbols). This determination may be performed by having the UE 215-*a* analyze a bit or bit sequence of a field in a DCI.

The base station 205 may transmit data to the UE 215-*a* on downlink symbols 405-*a* through 405-*c* via a first beam in a set of beamformed transmission 220-*a*. In some cases, each downlink symbol 405 may be separated by a guard interval 415, in which no transmission happens. In some examples, the UE 215-*a* and the UE 215-*b* may implicitly determine a length of guard interval, cyclic prefix, or cyclic suffix between some or all symbols of the TTI. For instance, the DCI may indicate that a discontiguous set of symbols (e.g., every other symbol) is allocated to the UE 215-*a* or the UE 215-*b*, and that UE may infer that there is no guard interval, cyclic prefix, or cyclic suffix, or that the guard interval, cyclic prefix, or cyclic suffix is a particular length. In another example, the DCI may indicate that a contiguous set of symbols (e.g., a set of consecutive symbols of a TTI) is allocated to the UE 215-*a* or the UE 215-*b*, and that UE may infer that there a guard interval, cyclic prefix, or cyclic suffix of a particular length between each of the allocated symbols.

Whether the length is implicitly determined or explicitly signaled, the UE 215-*a* or the UE 215-*b* may process its DCI to determine one or more symbols of a TTI allocated to it, and a length, if any, of the guard interval, cyclic prefix, or cyclic suffix between each symbol of the TTI. The UE 215-*b* may also determine a subset of symbols in a TTI allocated to it based on received control information. For example, the UE 215-*b* may determine that a fourth, sixth, and eighth downlink symbol (i.e., downlink symbols 410-*a* through 410-*c*) of the TTI are allocated for data transmission. The base station 205 may transmit data to the UE 215-*b* on downlink symbols 410-*a* through 410-*c* via a second beam in a set of beamformed transmissions 220-*d*. Additionally, each downlink symbol 410 may be separated by a guard interval 415. The UE 215-*a* and the UE 215-*b* may process the control information to determine that each symbol of the TTI allocated to it has a guard interval 415 and a length of the guard interval 415.

In the symbol level scenario, the base station 205 may communicate with both the UE 215-*a* and the UE 215-*b* during a same TTI. This is possible, due to the nature of transmissions in mmW systems (i.e., directional or beamformed transmissions). The beamformed transmission 220-*a* directed to the UE 215-*a* may not interfere (e.g., be heard) with the UE 215-*b*. Similarly, the beamformed transmission 220-*d* directed to the UE 215-*b* may not affect the UE 215-*a*.

Figure 4C:
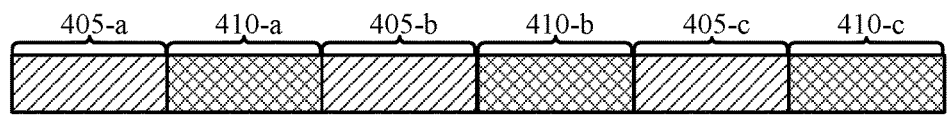

In some cases, the base station 205 may have a TTI where no guard interval is present, or a guard interval of reduced length compared to the guard interval 315 (e.g., short guard interval for beam switching purposes). For example, the UE 215-*a* and the UE 215-*b* may process control information to determine that the plurality of symbols of the TTI do not have a guard interval or have a guard interval of reduced length (e.g., short guard interval). In some cases, a guard interval with a reduced duration may enable beam switching, but may not be sufficiently long to mitigate ISI. FIG. 4C illustrates an example of a configuration 400-*c* that supports overhead reduction in mmW systems in accordance with various aspects of the present disclosure. As illustrated in FIG. 4C, by utilizing symbol level time division multiplexing for two UEs (e.g., the UE 215-*a* and the UE 215-*b*), the system 200 may achieve benefits of the guard interval without actually including any guard interval between symbols of the TTI. In this example, the base station 205 may transmit data to the UE 215-*a* on downlink symbol 405-*a* via beamformed transmissions 220-*a*, and immediately after transmit data to the UE 215-*b* on downlink symbol 410-*a* via beamformed transmissions 220-*a*, without any delay (i.e., waiting for a guard interval to lapse). The base station 205 may interleave beamformed transmissions of symbols 405-*a*, 405-*b*, and 405-*c* on a first beam to UE 215-*a* with beamformed transmissions of symbols 405-*a*, 405-*b*, and 405-*c* on a second beam to UE 215-*b* within a TTI. The base station 205 may schedule the symbols of the TTI such that it transmits a beamformed transmission in a different direction (and to a different UE), to eliminate or reduce ISI.

Figure 4D:
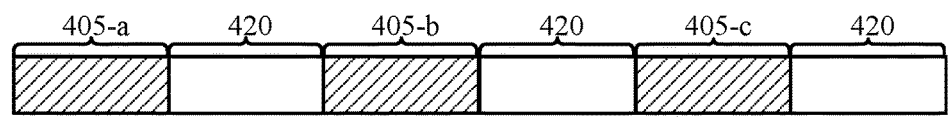
Figure 4E:
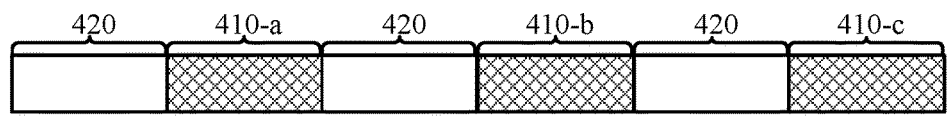

FIG. 4D illustrates an example of a configuration 400-*d* that supports overhead reduction in mmW systems in accordance with various aspects of the present disclosure. FIG. 4E illustrates an example of a configuration 400-*e* that supports overhead reduction in mmW systems in accordance with various aspects of the present disclosure. Because the beamformed transmissions are communicated in different directions, FIG. 4D represents a received signal at the UE 215-*a*, and FIG. 4E represents a received signal at the UE 215-*a*. Because beamformed transmissions to UE 215-*b* are sent in a different direction, UE 215-*a* is not able to detect, or detects at a significantly reduced level, the beamformed transmissions to UE 215-*b*. FIG. 4D thus represents these as pseudo guard intervals 420 that appears to the UE 215-*a* as if there is no transmission. Likewise, beamformed transmissions to UE 215-*a* are sent in a different direction, UE 215-*b* is not able to detect, or detects at a significantly reduced level, the beamformed transmissions to UE 215-*a*. FIG. 4E thus represents these as pseudo guard intervals 420 that appears to the UE 215-*b* as if there is no transmission.

Hence, both the configuration 400-*d* and 400-*e* illustrate examples utilizing the nature of transmissions in mmW systems (i.e., directional or beamformed transmissions) by applying symbol level TDM to reduce or eliminate guard interval overhead while preserving benefits of the guard interval by reducing or eliminating ISI without actually having guard intervals present in the TTI. That is, beamformed transmissions to a first UE appear as a guard interval (or silence) to a second UE, provided that the beams are sent in different (i.e., orthogonal) directions. Beams are orthogonal if, for example, measured ISI at each of the UEs 215-*a*, 215-*b* satisfies a threshold (e.g., measured ISI equals or is less than a threshold).

In some cases, the UE 215-*a* and the UE 215-*b* may handle delay spread better than a cyclic prefix without any ISI issues, by utilizing the guard interval in directional or beamformed transmissions. With reference to FIG. 2, the base station 205 may interleave a first subset of symbols allocated to the UE 215-a with a second subset of symbols allocated to the UE 215-b in the TTI 225. The UE 215-a and the UE 215-b may process the control information to determine a position within the TTI 225 associated with each symbol of the subset and determine that the subset is contiguous or discontiguous based on the determined position. For example, the UE 215-a or the UE 215-b may determine that symbols 2 through 6 in the TTI 225 are assigned to it for communicating with the base station 205 (e.g., data transmission). Hence, the subset is contiguous because symbols 2 through 6 are adjacent to one another in time. In some cases, the UE 215-a or the UE 215-b may determine a length of at least one symbol associated with the plurality of symbols of the TTI 225 based on the control information.

Alternatively or additionally, the UE 215-a or the UE 215-b may determine that symbols 2, 4, 6, and 8 in the TTI 225 are assigned to it for communicating with the base station 205. In this case, the subset is discontiguous because symbols 2, 4, 6, and 8 are nonadjacent in time. For example, in the configuration 400-c, the UE 215-a may determine that the subset of downlink symbols 405-a through 405-c are discontiguous based on the position of each downlink symbol in the TTI. In some cases, the UE 215-a or the UE 215-b may infer a length of a guard interval based on scheduling information received in the control information from the base station 205. For example, if the UE 215-a or the UE 215-b determines that a subset of allocated resources are discontiguous, the UE 215-a or the UE 215-b may assume a guard interval having a short length (e.g., for beam switching purposes), or that there is no guard interval, without the base station 205 explicitly indicating the guard interval duration in the control information.

In some examples, the base station 205 may unequally allocate symbols between the UE 215-a and the UE 215-b in the TTI 225. The base station 205 may unequally allocate symbols of different lengths or different durations of symbols within the TTI 225 to the UE 215-a and the UE 215-b. In some cases, resources may be unequally allocated within a TTI (e.g., slot or subframe) by allocating different symbol lengths to different UEs. In an example, DCI for UE 215-a may indicate a first length for a first subset of symbols of the TTI 225 allocated to the UE 215-a, and DCI for UE 215-b may indicate a second length for a second subset of symbols of the TTI 225 allocated to the UE 215-b, where the first and second lengths may differ. In some examples, to provide unequal resource allocation, the base station 205 may preconfigure a TTI for unequal resource allocation. In OFDM/SC-FDM systems, different subcarrier spacing for a same bandwidth may be used to provide different symbol sizes, and hence unequally allocate resources to different UEs. In another example, for SC-QAM systems the base station 205 may use a different number of time domain tones to provide unequal resource allocation. In some examples, different durations of symbols may be allocated to different UEs. In a contiguous case for unequal resource allocation, the base station 205 may communicate control information allocating different durations of symbols to different UEs. For example, the base station 205 may allocate, in DCI, seven downlink symbols (e.g., 2 through 8) to the UE 215-a and five downlink symbols (e.g., 9 through 13) to the UE 215-b. In another example, for a discontiguous case, the base station 205 may allocate six downlink symbols in a non-consecutive manner (e.g., 2, 4, 6, 8, 10, and 12) to the UE 215-a and the six downlink symbols (e.g., 3, 5, 7, 9, 11, and 13) to the UE 215-b.

Figure 5A:
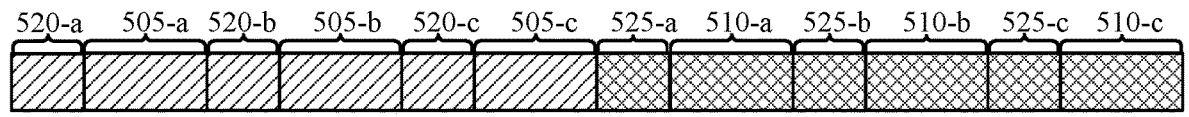
FIGS. 5A through 5C illustrates an example of a configuration that supports overhead reduction in mmW systems in accordance with aspects of the present disclosure.

Some example wireless communication systems (e.g., OFDM systems) may use cyclic prefix to combat ISI between symbols and assist frequency domain equalization (FDE). The base station 205 may apply a cyclic prefix between each symbol allocated to the UE 215-a and the UE 215-b. FIG. 5A illustrates an example of a configuration 500-a that supports overhead reduction in mmW systems in accordance with various aspects of the present disclosure. In some examples, configuration 500-a may implement aspects of the system 100 and 200. In some examples, the configuration 500-a may apply to OFDM techniques. In one example, the base station 205 may provide slot level time division multiplexing of symbols for the UE 215-a and the UE 215-b and communicate the symbols in a set of beamformed transmissions using beams directed in different directions (e.g., beamformed transmission 220-a and beamformed transmission 220-d).

The UE 215-a and the UE 215-b may determine that a respective subset of symbols in a TTI are allocated to it based on received control information. For example, the UE 215-a may determine that downlink symbols 505-a through 505-c are allocated for UE 215-a to receive downlink data transmission based on an indication carried in a DCI field of a DCI transmitted from the base station 205. Similarly, the UE 215-b may determine that downlink symbols 510-a through 510-c are allocated for UE 215-b to receive downlink data transmission. In some examples, the downlink symbols 505-a through 505-c may correspond to a first slot (e.g., TTI) and the downlink symbols 510-a through 510-c may correspond to a second slot (e.g., second TTI). As such, in the slot level scenario, the base station 205 may only communicate with a single UE during a slot.

Alternatively or additionally, the configuration 500-a may illustrate a symbol level time division multiplexing of symbols for the UE 215-a and the UE 215-b where the symbols are communicated in a set of beamformed transmissions using beams directed in different directions (e.g., beamformed transmission 220-a and beamformed transmission 220-d). In some cases, the configuration 500-a may illustrate the base station 205 scheduling and allocating resources of a single TTI (e.g., TTI 225) in a contiguous manner. For example, the configuration 500-a may depict symbols of a data channel of the TTI, and the base station 205 may allocate downlink symbols 505-a through 505-c and 510-a through 510-c to be consecutive (e.g., adjacent to each other in time).

The base station 205 may transmit data to the UE 215-a on downlink symbols 505-a through 505-c via a set of beamformed transmissions 220-a directed in a first direction toward UE 215-a, and to the UE 215-b on downlink symbols 510-a through 510-c via a set of beamformed transmission 220-d directed in a second direction toward UE 215-b. In some cases, each downlink symbol 505 or 510 may be separated by a cyclic prefix or a cyclic suffix. The base station 205 may determine a length of a cyclic prefix or a cyclic suffix. The base station 205 may also indicate a delay spread or a length of the cyclic prefix in a DCI on every slot for a TTI (e.g., TTI 225), which may also apply for a group of following slots in the TTI or a different TTI. The cyclic prefix or the cyclic suffix may be a period of time between symbols that functions as a buffer to protect from ISI.

The base station 205 may generate cyclic prefixes or cyclic suffixes so that each symbol is preceded by a copy of the end portion of that same symbol. For example, the base station 205 may generate cyclic prefix 520-a for downlink symbol 505-a, cyclic prefix 520-b for downlink symbol 505-b, and cyclic prefix 520-c for downlink symbol 505-c associated with the UE 215-*a*, and transmit cyclic prefix 520-*a* through cyclic prefix 520-*c* using the same beam aimed in the direction of UE 215-*a* as downlink symbols 505-*a* through 505-*c*. The base station 205 may generate cyclic prefix 525-*a* for downlink symbol 510-*a*, cyclic prefix 525-*b* for downlink symbol 510-*b*, and cyclic prefix 525-*c* for downlink symbol 510-*c* associated with the UE 215-*b*, and transmit cyclic prefix 525-*a* through cyclic prefix 525-*c* using the same beam aimed in the direction of UE 215-*b* as downlink symbols 510-*a* through 510-*c*. By applying cyclic prefixes between each symbol, no interference from previous symbols may exist (e.g., data symbols have no interference from previous symbols when a delay spread is less than the cyclic prefix). In some cases, the UE 215-*a* and the UE 215-*b* may discard the cyclic prefixes and perform an inverse fast Fourier transform (IFFT) of a symbol portion for further processing (e.g., decoding data carried in the symbol).

Figure 5B:
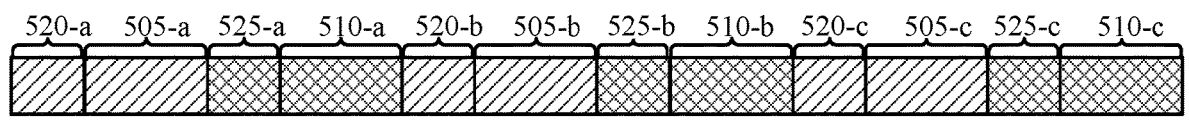

FIG. 5B illustrates an example of a configuration 500-*b* that supports overhead reduction in mmW systems in accordance with various aspects of the present disclosure. In some cases, the configuration 500-*b* may illustrate the base station 205 scheduling and allocating resources of a single TTI (e.g., TTI 225) in a discontiguous manner. For example, the configuration 500-*b* may depict symbols of a data channel of the TTI, and the base station 205 may allocate downlink symbols 505-*a* through 505-*c* and 510-*a* through 510-*c* to be nonconsecutive (i.e., not adjacent to each other). In FIG. 5B, the base station 205 may use a first beam aimed in the direction of UE 215-*a* to transmit cyclic prefix 520-*a* through cyclic prefix 520-*c* and downlink symbols 505-*a* through 505-*c*, and may use a second beam aimed in the direction of UE 215-*b* to transmit cyclic prefix 525-*a* through cyclic prefix 525-*b* and downlink symbols 510-*a* through 510-*c*.

The UE 215-*a* and the UE 215-*b* may determine that a respective subset of symbols in a TTI are allocated to it based on received control information. For example, the UE 215-*a* and the UE 215-*b* may process the control information to determine a TDM schedule for the TTI. The TDM schedule may indicate a scheduling order for symbols of the TTI. The scheduling order may indicate a subset of symbols of a TTI allocated to a particular UE, and the position (or index) of each allocated symbol within the TTI. The position (or index) may identify a particular symbol period within the TTI. In some examples, the scheduling order may be UE-specific, and indicate symbols allocated to a particular UE, but may not indicate symbols allocated to any other UE.

In an example, the scheduling order of the TTI may indicate to the UE 215-*a* or the UE 215-5 if the subset of symbols are allocated in contiguous or discontiguous manner. The UE 215-*a* may determine that downlink symbols 505-*a* through 505-*c* correspond to symbols index positions 2, 4, and 6 of the TTI 225, and the UE 215-*b* may determine that downlink symbols 510-*a* through 510-*c* correspond to symbol index positions 3, 5, and 7 in the TTI 225. As a result, the UE 215-*a* and the UE 215-*b* may determine that the allocated downlink symbols are scheduled discontiguously because the allocated downlink symbols are not adjacent to each other in time.

The UE 215-*a* and the UE 215-*b* may also process the control information to determine that each symbol of the TTI has a cyclic prefix or a cyclic suffix and a length of the cyclic prefix or the cyclic suffix, as described with reference to FIG. 5A. By applying cyclic prefixes between each downlink symbol, no interference, or interference below a threshold, from previous symbols may exist (e.g., data symbols have no interference from previous symbols when a delay spread is less than the cyclic prefix). Hence, downlink symbols of the UE 215-*a* may experience less interference from other symbols transmitted by the base station 205 to the UE 215-*b*. The base station 205 may obtain better signal-to-interference-plus-noise ratio (SINR) by using cyclic prefixes 520 and 525. Also, the UE 215-*a* and the UE 215-*b* may acquire higher SINR for demodulation by having cyclic prefixes 520 and 525 positioned between each downlink symbol. In some examples, the UE 215-*a* and the UE 215-*b* may infer a presence or absence of a cyclic prefix based on scheduling information. For example, if the UE 215-*a* and the UE 215-*b* determine that the allocated symbols are discontiguous, the UE 215-*a* and the UE 215-*b* may assume a shorter length of a cyclic prefix. In some cases, a longest cyclic prefix length may be a symbol period. Hence, a shorter length of a cyclic prefix may be shorter than a symbol period.

Figure 5C:
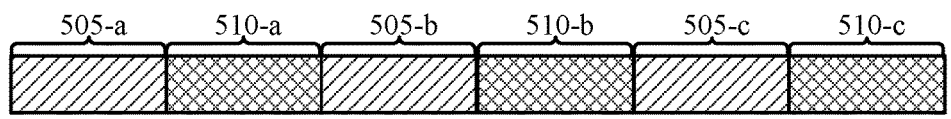

FIG. 5C illustrates an example of a configuration 500-*c* that supports overhead reduction in mmW systems in accordance with various aspects of the present disclosure. The base station 205 may eliminate or reduce use of cyclic prefixes between symbols. This may apply when the base station 205 has more than one UE to schedule. The base station 205 may also perform smart UE selection and has the option to selectively determine a length of a guard interval, cyclic prefix, or cyclic suffix between symbols of a TTI. The base station 205 may select the UE 215-*a* or the UE 215-*b* for a same TTI such that beamformed transmissions are sent in different (i.e., orthogonal) directions. The base station 205 may determine that beams are orthogonal if, for example, measured ISI at each of the UEs 215-*a*, 215-*b* satisfies a threshold (e.g., measured ISI equals or is less than a threshold). Because beams are sent in different directions, this reduces ISI and hence a shorter length guard interval, cyclic prefix, or cyclic suffix may be used, or guard interval, cyclic prefix, or cyclic suffix may be eliminated. For example, a beamformed transmission 220-*a* to the UE 215-*a* may be transmitted on a beam directed towards to the UE 215-*a* from the base station 205. The UE 215-*b* may be in a different direction, and may not receive scarcely any of the transmission. Hence, a transmission to the UE 215-*a* may not cause any ISI for the UE 215-*b*, or an amount of ISI that satisfies an ISI threshold.

The base station 205 may determine and indicate a length of the cyclic prefixes in control information transmitted to the UE 215-*a* and the UE 215-*b*. The UE 215-*a* and the UE 215-*b* may process the control information to determine that allocated resources (e.g., downlink symbols) do not have a cyclic prefix or a cyclic suffix. In some cases, the base station 205 may eliminate cyclic prefixes in response to determining that the beamformed transmission 220-*a* and 220-*d* are orthogonal to each other (e.g., ISI is less than an ISI threshold). As a result, the base station 205 may transmit data to the UE 215-*a* on downlink symbol 505 via beamformed transmissions 220-*a*, and immediately after transmit data to the UE 215-*b* on downlink symbol 510 via beamformed transmissions 220-*a*, without any cyclic prefix between the downlink symbols 505 and 510. Alternatively or additionally, the base station 205 may reduce a cyclic prefix size for the UE 215-*a* and the UE 215-*b*, in case that the beamformed transmission 220-*a* and 220-*d* are not determined to be orthogonal (e.g., do not satisfy an ISI threshold). A reduced cyclic prefix size may prevent or reduce ISI that potentially may, in some cases, result from a few strong paths of the beamformed transmission 220-*a* and 220-*d*.

With reference to FIG. 2, the base station 205 may transmit PI between symbols (e.g., in SC-QAM waveforms). PI may be a known reference sequence that may be used for channel estimation, and may function as a guard interval between symbols of a TTI. In some examples, due to beam switching when communicating with the UE 215-a and the UE 215-b, there may be phase discontinuity across symbols of a TTI assigned for a same UE. To mitigate the phase discontinuity, the base station 205 may provide PIs between symbols for phase tracking. In some cases, spreading a transmission across the TTI 225 may also necessitate PIs between symbols for channel tracking due to Doppler effects.

FIG. 6A illustrates an example of a configuration 600-a that supports overhead reduction in mmW systems in accordance with various aspects of the present disclosure. In some examples, configuration 600-a may implement aspects of the system 100 and 200. Here, the base station 205 may provide slot level time division multiplexing of beamformed transmission to the UE 215-a and the UE 215-b in different beam directions (e.g., beamformed transmission 220-a and beamformed transmission 220-d). In the example configuration 600-a, the UE 215-a may determine a set of symbols in a TTI allocated to it based on received control information. For example, the UE 215-a and the UE 215-b may determine that downlink symbols 605-a through 605-c and the downlink symbols 610-a through 610-c are allocated for the UE 215-a and the UE 215-b to receive downlink data transmission from the base station 205 based on an indication carried in a DCI field of a DCI transmitted from the base station 205.

The base station 205 may transmit data to the UE 215-a on downlink symbols 605-a through 605-c via a set of beamformed transmissions 220-a communicated via a first beam and transmit data to the UE 215-b on downlink symbols 610-a through 610-c via a set of beamformed transmissions 220-b communicated via a second beam. In some cases, each downlink symbol 605 may be separated by a PI 615. The base station 205 may communicate a pilot sequence during the PI 615 to the UE 215-a via the first beam. For example, the base station 205 may transmit to the UE 215-a a downlink symbol 605-a followed by a pilot sequence during PI 615-a via the first beam, a downlink symbol 605-b followed by a pilot sequence during PI 615-b via the first beam, and a downlink symbol 605-c followed by a pilot sequence during PI 615-c via the first beam.

The UE 215-a may measure the pilot sequence communicated between two symbols (e.g., between downlink symbol 605-a and 605-b) and decode the beamformed transmissions 220-a based on the measured pilot sequence. A pilot sequence may be a sequence of bits transmitted in a symbol period on a set of subcarriers with a known phase. The UE 215-a may take samples of the pilot sequence in the symbol period for the set of subcarriers, and determine a phase for each of the subcarriers, to determine a phase correction by comparing the known phase to the received phase. The UE 215-a may then make a phase correction to samples in the nearby symbol periods to improve decoding performance when decoding one or more beamformed transmissions of one or more symbols on a particular beam. In some examples, the downlink symbols 605-a through 605-c may correspond to a first slot. The UE 215-b may also determine a set of symbols in a TTI allocated to it based on received control information. For example, the UE 215-b may determine that downlink symbols 610-a through 610-c are allocated for data transmission.

The base station 205 may transmit data to the UE 215-b on downlink symbols 610-a through 610-c via a set of beamformed transmissions 220-d communicated via a second beam. In some cases, each downlink symbol 610 may be separated by a PI 620. The base station 205 may communicate a pilot sequence during the PI 620 to the UE 215-b via the second beam. For example, the base station 205 may transmit to the UE 215-b a downlink symbol 610-a followed by a pilot sequence during PI 620-a via the second beam, a downlink symbol 610-b followed by a pilot sequence during PI 620-b via the second beam, and a downlink symbol 610-c followed by a pilot sequence during PI 620-c via the second beam.

The UE 215-b may measure the pilot sequence communicated between two symbols (e.g., between downlink symbol 610-a and 610-b) and decode the beamformed transmissions 220-d based on the measured pilot sequence. In some examples, the downlink symbols 610-a through 610-c may correspond to a second slot different from the first slot. As such, in the slot level scenario, the base station 205 may only communicate with a single UE during a slot. In the example configuration 600-a, the PI 615 for the UE 215-a or the PI 620 for the UE 215-b may cause ISI into the data symbol (e.g., downlink symbol 605-b or downlink symbol 610-b) at both start and end of the data symbol. To mitigate the ISI introduced by the PI, the base station 205 may schedule and allocate resources according to symbol level TDM scheduling.

With reference to FIG. 2, in some cases, even though a cyclic prefix, a guard interval, or a PI size for different symbols in a TTI may change, the size of the TTI may remain the same (e.g., include the same time and frequency resources). For example, the TTI may correspond to a defined time interval and a defined bandwidth. As such, the UE 215-a and the UE 215-b may listen for control information at every TTI boundary (e.g., monitor for PDCCH at every TTI boundary). The base station 205 scheduler and the UE 215-a or the UE 215-b processing (e.g., the UEs 215 look for PDCCH at every slot boundary) may be beneficially simplified by adjusting the number of symbols in the TTI. For example, the number of symbols may be increased when reduced or no cyclic prefix is used relative to when a normal cyclic prefix is used.

FIG. 6B illustrates an example of a configuration 600-b that supports overhead reduction in mmW systems in accordance with various aspects of the present disclosure. In some examples, configuration 600-b may implement aspects of the system 100 and 200. The base station 205 may provide symbol level time division multiplexing of beamformed transmissions to the UE 215-a and the UE 215-b in different beam directions (e.g., beamformed transmission 220-a and beamformed transmission 220-d). In the example configuration 600-b, the UE 215-a may determine a subset of symbols in a TTI allocated to it based on received control information. For example, the UE 215-a and the UE 215-b may determine that downlink symbols 605-a through 605-c and the downlink symbols 610-a through 610-c are allocated for data transmission based on an indication carried in a DCI transmitted from the base station 205.

The base station 205 may alternate transmitting symbol and pilot sequence pairs on different beams to different UEs in a TTI 225. In an example, base station 205 may transmit to the UE 215-a a downlink symbol 605-a followed by a pilot sequence during PI 615-a via a first beam, may transmit to the UE 215-b a downlink symbol 610-a followed by a pilot sequence during PI 620-a via a second beam, transmit to the UE 215-a a downlink symbol 605-b followed by a pilot sequence during PI 615-*b* via the first beam, may transmit to the UE 215-*b* a downlink symbol 610-*b* followed by a pilot sequence during PI 620-*b* via the second beam, transmit to the UE 215-*a* a downlink symbol 605-*c* followed by a pilot sequence during PI 615-*c* via the first beam, and may transmit to the UE 215-*b* a downlink symbol 610-*c* followed by a pilot sequence during PI 620-*c* via the second beam.

In symbol level TDM, the PI 615 for the UE 215-*a* may be followed by a data symbol for the UE 215-*b*. In some instances, this may cause ISI to the data symbol only at the end for the UE 215-*b*. The data symbol for the UE 215-*b* may be silent for the UE 215-*a*. For example, a beamformed transmission 220-*a* to the UE 215-*a* may be transmitted on a beam directed towards the UE 215-*a* from the base station 205. The UE 215-*b* may be in a different direction, and does not receive scarcely any of the transmission. Hence, a transmission to the UE 215-*a* does not cause any ISI for the UE 215-*b*. As a result, a channel estimation becomes better. In addition, the SINR of the data symbol improves because there is no ISI from previous symbol pilot into the current data symbol. In some examples, the UE 215-*a* and the UE 215-*b* may consider both the downlink symbol and PI duration to demodulate data carried in the downlink symbol. In some cases, a delay spread longer than a length of the PI 615 or the PI 620 may not cause ISI from another symbol at the UE 215-*a* or the UE 215-*b*.

It is noted that the above examples described allocating symbols to two UEs, and the techniques may be extended to allocate as few as a single symbol to each UE up to the number of symbols of a data channel of a TTI. Further, examples herein specifically referring to a guard interval, may be similarly applied for use of a cyclic prefix or a cyclic suffix, examples herein specifically referring to a cyclic prefix may be similarly applied for use of a guard interval or a cyclic suffix, and examples herein specifically referring to a cyclic suffix may be similarly applied for use of a cyclic prefix or a guard interval. The techniques described herein may also be applied to other gaps between symbols of a TTI.

Figure 7:
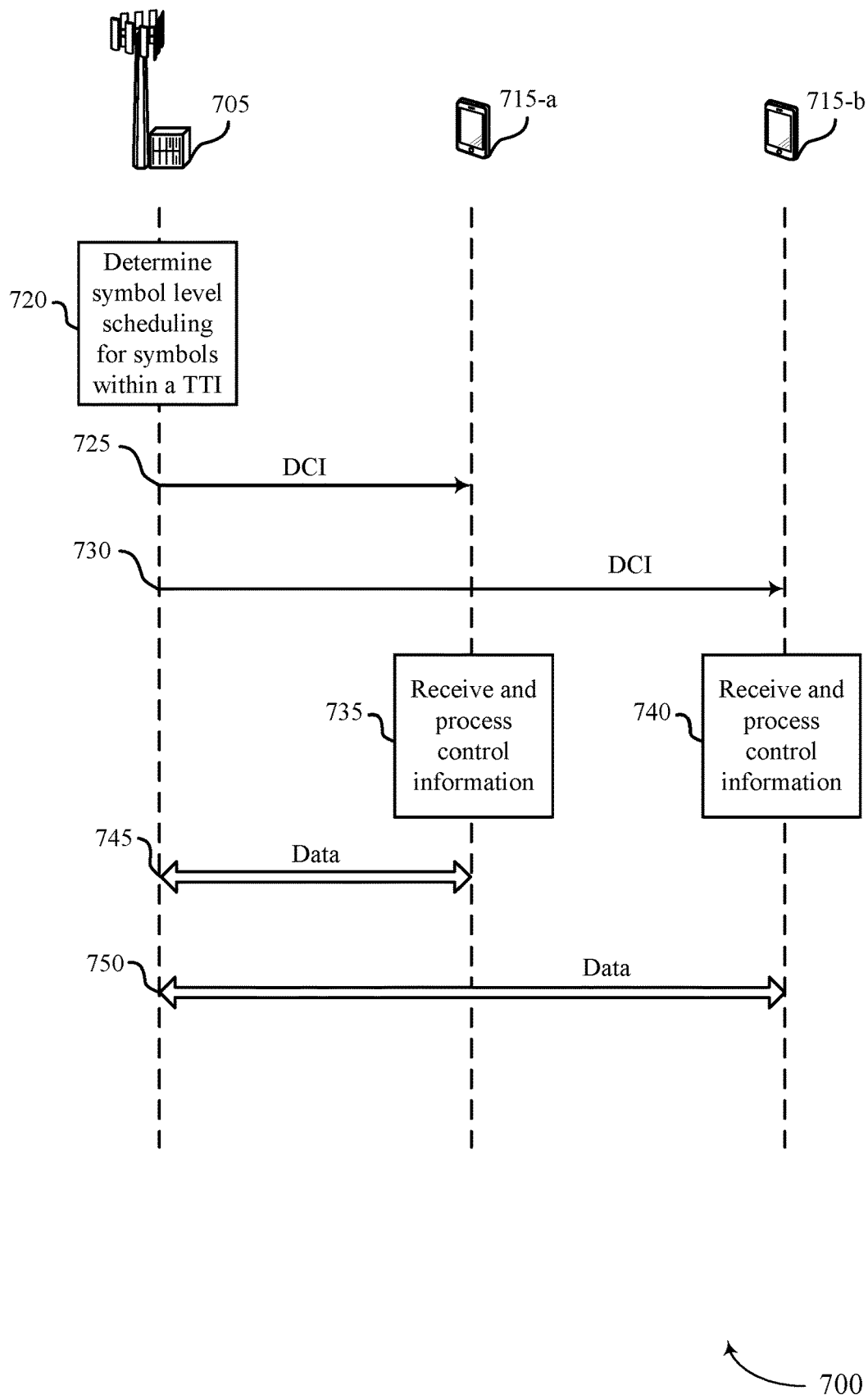
FIG. 7 illustrates an example of a process flow that supports overhead reduction in mmW systems in accordance with aspects of the present disclosure.

FIG. 7 illustrates an example of a process flow 700 that supports overhead reduction in mmW systems in accordance with various aspects of the present disclosure. In some examples, process flow 700 may implement aspects of the system 100 and 200. Base station 705, UE 715-*a*, and UE 715-*b* may be examples of the corresponding devices described with reference to FIGS. 1 and 2.

In the following description of the process flow 700, the operations between the base station 705, the UE 715-*a*, and the UE 715-*b* may be transmitted in a different order than the exemplary order shown, or the operations performed by the base station 705, the UE 715-*a*, and the UE 715-*b* may be performed in different orders or at different times. Some operations may also be left out of the process flow 700, or other operations may be added to the process flow 700.

In some examples, process flow 700 may commence with the base station 705 establishing a connection with each of the UE 715-*a* and the UE 715-*b* (e.g., performing a RRC procedure with each).

At 720, the base station 705 may determine symbol level scheduling for symbols within a TTI. For example, the base station 705 may determine scheduling for a plurality of symbols allocated to the UE 715-*a* and the UE 715-*b* within a same TTI. The base station 705 may schedule symbols for uplink transmissions, downlink transmissions, or both. The base station 705 may select to allocate symbols to the UE 715-*a* and UE 715-*b* because first and second beams used to communicate with UE 715-*a* and UE 715-*b* are determined to be orthogonal (e.g., satisfy an ISI threshold).

At 725, the base station 705 may transmit a DCI to the UE 715-*a*. At 730, the base station 705 may, additionally or alternatively, transmit a DCI to the UE 715-*b*. The base station 705 may transmit the DCI on a PDCCH of the TTI. The DCI may include scheduling information indicating the allocated resources for downlink and uplink transmissions for the UE 715-*a* and the UE 715-*b* within a same TTI. In some cases, the DCI may be UE-specific, and each UE may monitor a search space of a control channel of a TTI for its DCI.

At 735, the UE 715-*a* may receive and process the control information. Similarly, at 740 the UE 715-*b* may receive and process the control information. For example, the UE 715-*a* and the UE 715-*b* may receive and decode the DCI to determine a respective subset of symbols of the TTI are allocated to the UE 715-*a* and the UE 715-*b*, and symbol level scheduling for the subset of symbols within the TTI. For instance, the UE 715-*a* and the UE 715-*b* may process the control information to determine a position within the TTI associated with each symbol of the subset and determine that the subset of symbols are contiguous or discontiguous based on the determined positions. In some examples, the UE 715-*a* or the UE 715-*b* may determine a length of at least one of the symbols of the TTI based on the control information. In some examples, the UE 715-*a* and the UE 715-*b* may determine a length of a guard interval, or a cyclic prefix, or a cyclic suffix, associated with the symbols of the TTI based on whether the symbols of the subset are contiguous or discontiguous in the TTI. Alternatively or additionally, the UE 715-*a* and the UE 715-*b* may process the control information in the received DCIs to determine that no guard interval, cyclic prefix, or cyclic suffix is present in the allocated symbols of the TTI.

At 745, the base station 705 and the UE 715-*a* may, in accordance with the symbol level scheduling, communicate during the TTI using a plurality of beamformed transmissions based on the control information. For example, the base station 705 may communicate in the TTI a set of beamformed transmissions using a first beam aimed in the direction of UE 715-*a*. The base station 705 may communicate downlink beamformed transmissions using the first beam in symbol periods of the TTI corresponding to the symbols allocated to the UE 715-*a*. The UE 715-*a* may receive downlink beamformed transmissions from base station 705 within the allocated symbols. The spacing between the beamformed transmissions may correspond to the determined length between each of the symbols within the TTI.

At 750, the base station 705 and the UE 715-*b* may also, in accordance with the symbol level scheduling, communicate during the TTI using a plurality of beamformed transmissions based on the control information. For example, the base station 705 may communicate in the TTI a set of beamformed transmissions using a second beam aimed in the direction of UE 715-*b*. The base station 705 may communicate downlink beamformed transmissions using the second beam in symbol periods of the TTI corresponding to the symbols allocated to the UE 715-*b*. The UE 715-*b* may receive downlink beamformed transmissions from base station 705 within the allocated symbols. The spacing between the beamformed transmissions may correspond to the determined length between each of the symbols within the TTI. In some examples, the different UEs 715-*a*, 715-*b* may not be able to process UE-specific DCI for a different UE. The base station 705 may explicitly indicate same length of the guard interval, cyclic prefix or cyclic suffix, or indication that the TTI does not include a guard interval, cyclic prefix, or cyclic suffix, to each UE **715-*a*, 715-*b*, or may provide an indication in each of the UE-specific DCIs enabling each UE 715-*a*, 715-*b*** to determine the same length of the guard interval, cyclic prefix or cyclic suffix, or indication that the TTI does not include a guard interval, cyclic prefix, or cyclic suffix.

Beneficially, the techniques described herein may provide for symbol level scheduling of different UEs within the same TTI, and describe how beamformed transmissions in different directions may be used to reduce overhead without having ISI detrimentally impact throughput.

Figure 8:
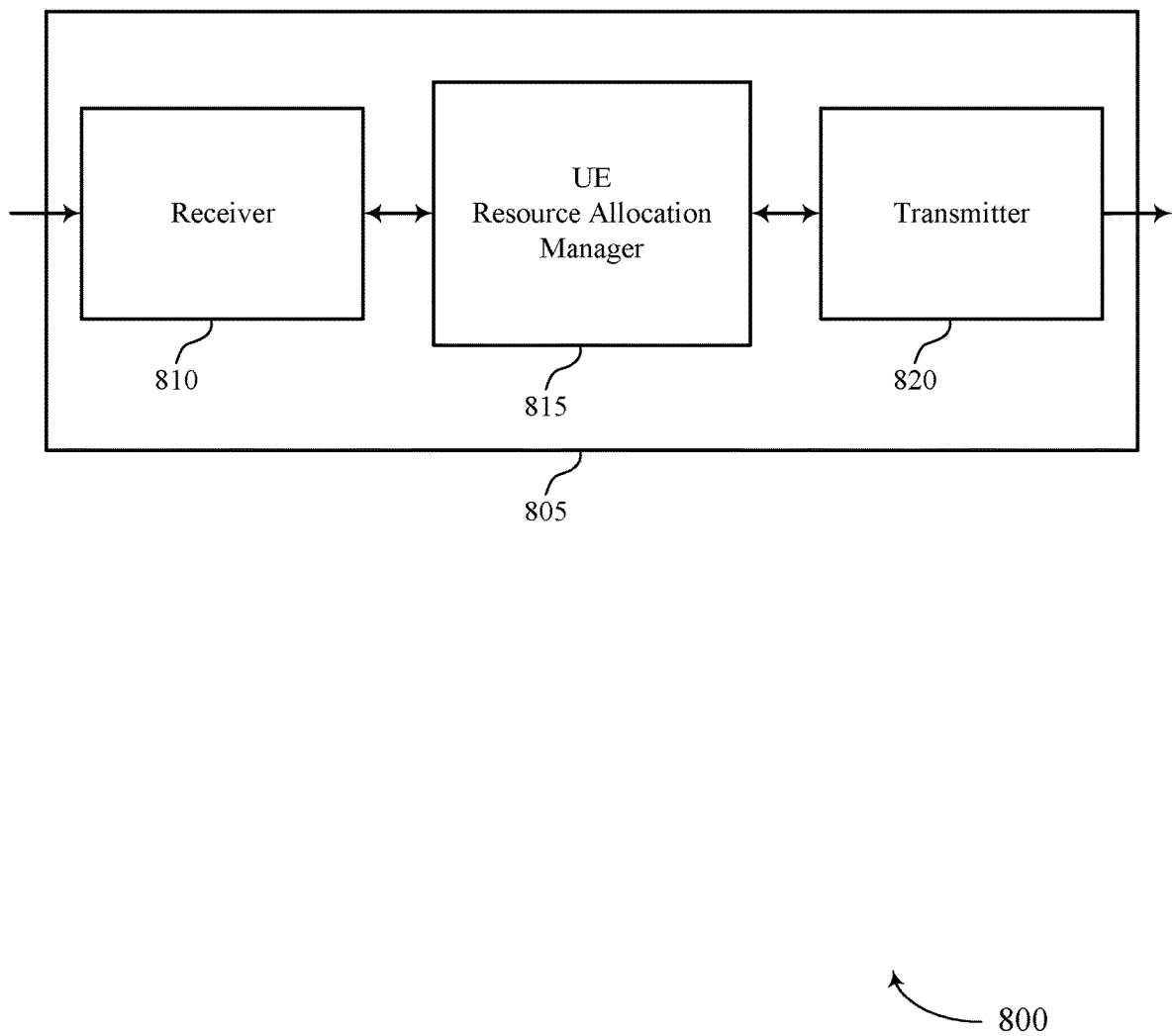
FIGS. 8 through 10 show block diagrams of a device that supports overhead reduction in mmW systems in accordance with aspects of the present disclosure.

FIG. 8 shows a block diagram 800 of a wireless device 805 that supports overhead reduction in mmW systems in accordance with aspects of the present disclosure. Wireless device 805 may be an example of aspects of a UE 115 as described herein. Wireless device 805 may include receiver 810, UE resource allocation manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to overhead reduction in mmW systems, etc.). Information may be passed on to other components of the device. The receiver 810 may be an example of aspects of the transceiver 1135 described with reference to FIG. 11. The receiver 810 may utilize a single antenna or a set of antennas.

UE resource allocation manager 815 may be an example of aspects of the UE resource allocation manager 1115 described with reference to FIG. 11. UE resource allocation manager 815 and/or at least some of its various sub-components may be implemented in hardware, software executed by a processor, firmware, or any combination thereof. If implemented in software executed by a processor, the functions of the UE resource allocation manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE resource allocation manager 815 and/or at least some of its various sub-components may be physically located at various positions, including being distributed such that portions of functions are implemented at different physical locations by one or more physical devices. In some examples, UE resource allocation manager 815 and/or at least some of its various sub-components may be a separate and distinct component in accordance with various aspects of the present disclosure. In other examples, UE resource allocation manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource allocation manager 815 may receive control information in a control channel of a TTI, process the control information to determine a subset of a set of symbols of the TTI allocated to the UE, a symbol length or duration of the subset of the set of symbols allocated to the UE, and symbol level scheduling for the subset of the set of symbols within the TTI, and receive the subset of the set of symbols scheduled for the UE in the TTI, and beamformed towards it by the base station, based on the control information. For example, a UE may receive and process a DCI including determining which symbols are scheduled for the UE within a TTI and beamformed towards the UE. The UE may then receive and decode the allocated symbols scheduled for the UE. In some examples, the UE may also transmit in using one or more symbols of the set in the TTI allocated to it.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
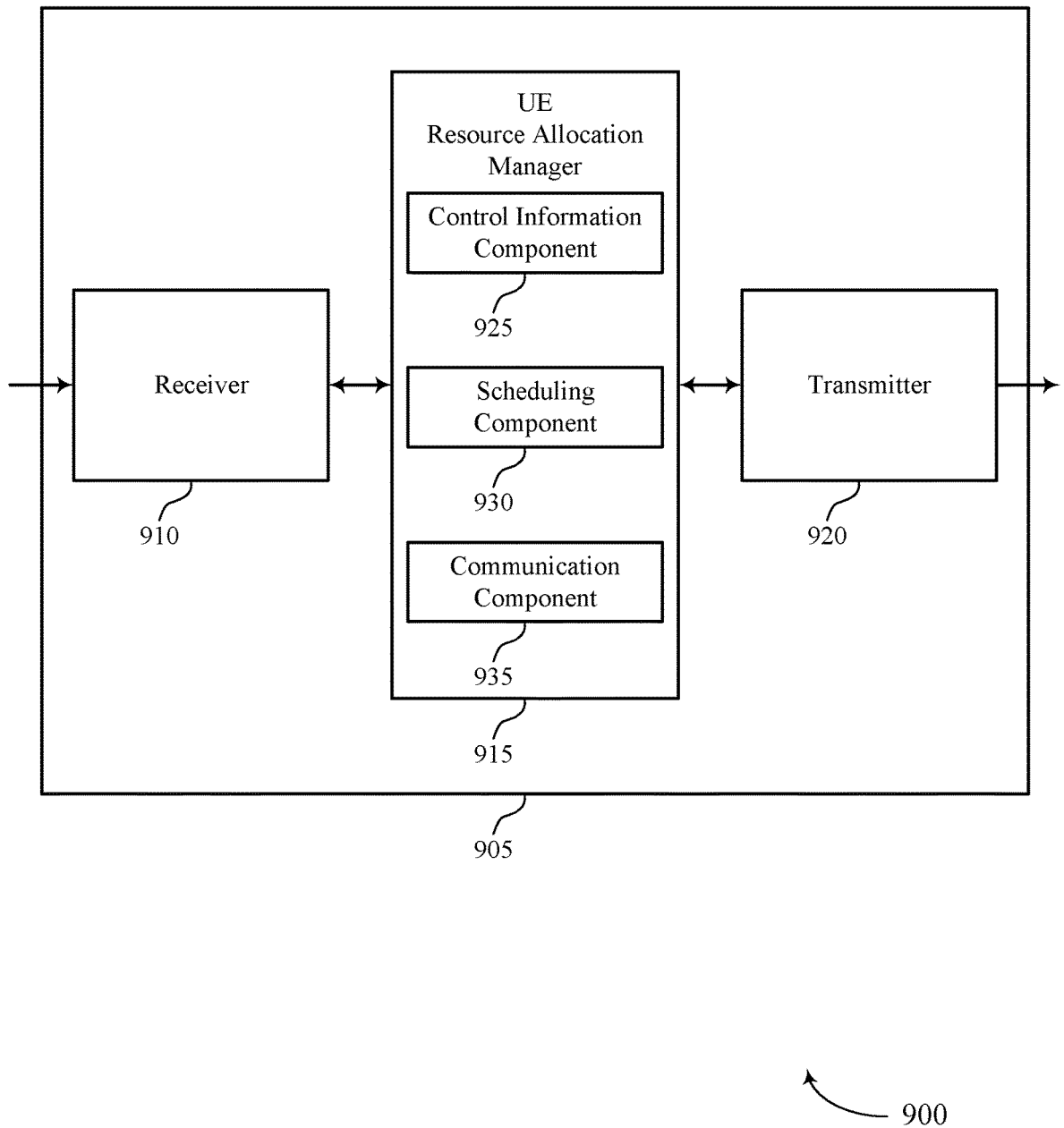

FIG. 9 shows a block diagram 900 of a wireless device 905 that supports overhead reduction in mmW systems in accordance with aspects of the present disclosure. Wireless device 905 may be an example of aspects of a wireless device 805 or a UE 115 as described with reference to FIG. 8. Wireless device 905 may include receiver 910, UE resource allocation manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to overhead reduction in mmW systems, etc.). Information may be passed on to other components of the device. The receiver 910 may be an example of aspects of the transceiver 1135 described with reference to FIG. 11. The receiver 910 may utilize a single antenna or a set of antennas.

UE resource allocation manager 915 may be an example of aspects of the UE resource allocation manager 1115 described with reference to FIG. 11. UE resource allocation manager 915 may also include control information component 925, scheduling component 930, and communication component 935.

Control information component 925 may receive control information in a control channel of a TTI. Control information component 925 may process the control information to determine a position within the TTI associated with each symbol of the subset of the set of symbols, and determine that the subset of the set of symbols are contiguous or discontiguous based on the determined positions. Control information component 925 may determine a length of at least one symbol associated with the plurality of symbols of the TTI based on the control information.

Scheduling component 930 may process the control information to determine a subset of a set of symbols of the TTI allocated to the UE, a symbol length or duration of the symbols allocated to the UE, and symbol level scheduling for the subset of the set of symbols within the TTI. In some cases, each of the set of symbols is associated with a downlink transmission. Communication component 935 may communicate during the TTI using a set of beamformed transmissions based on the control information.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
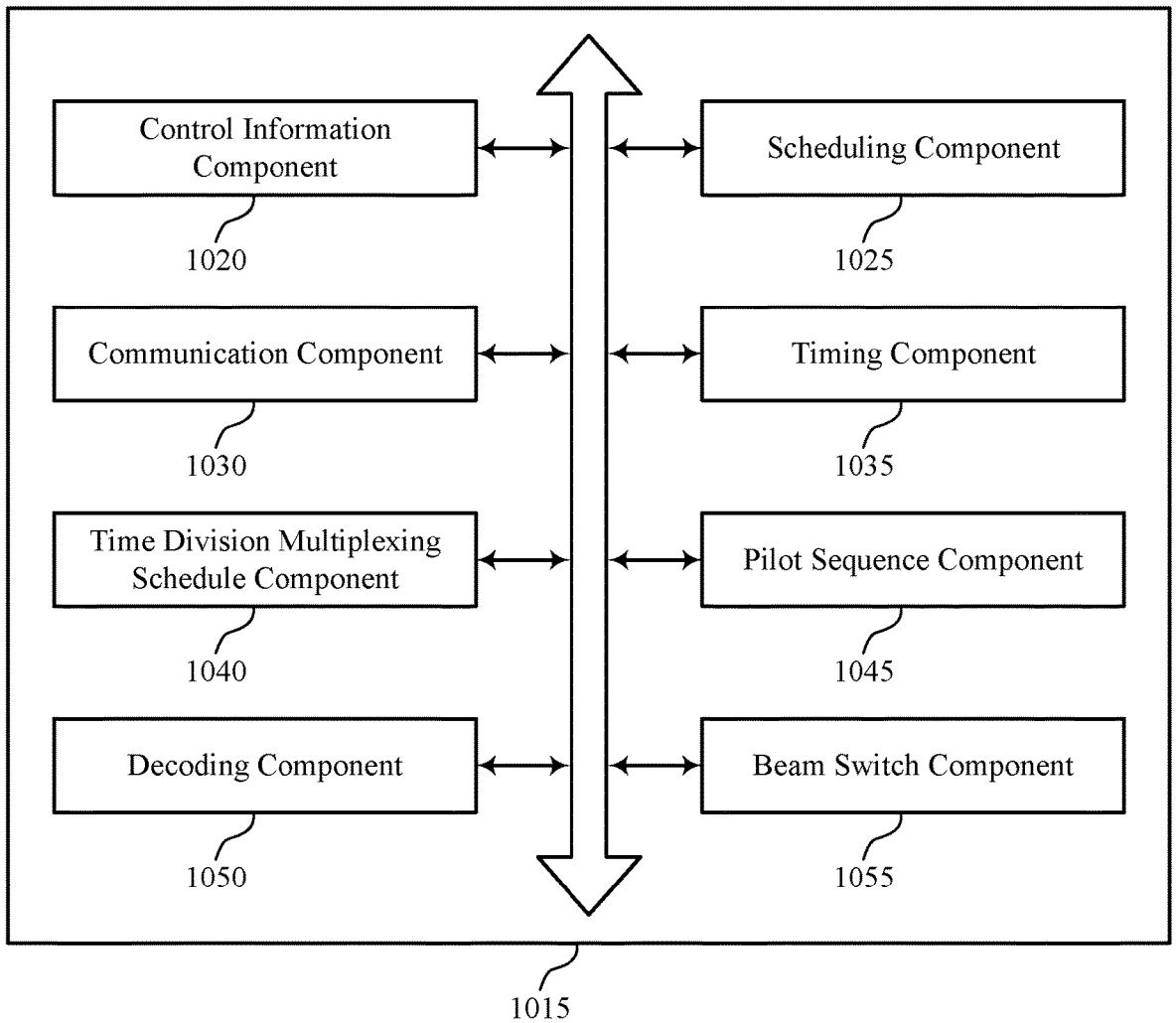

FIG. 10 shows a block diagram 1000 of a UE resource allocation manager 1015 that supports overhead reduction in mmW systems in accordance with aspects of the present disclosure. The UE resource allocation manager 1015 may be an example of aspects of a UE resource allocation manager 815, a UE resource allocation manager 915, or a UE resource allocation manager 1115 described with reference to FIGS. 8, 9, and 11. The UE resource allocation manager 1015 may include control information component 1020, scheduling component 1025, communication component 1030, timing component 1035, time division multiplexing schedule component 1040, pilot sequence component 1045, decoding component 1050, and beam switch component 1055. Each of these modules may communicate, directly or indirectly, with one another (e.g., via one or more buses).

Control information component 1020 may receive control information in a control channel of a TTI. Control information component 1020 may process the control information to determine a position within the TTI associated with each symbol of the subset of the set of symbols, and determine that the subset of the set of symbols are contiguous or discontiguous based on the determined positions. Control information component 1020 may determine a length of at least one symbol associated with the plurality of symbols of the TTI based on the control information.

Scheduling component 1025 may process the control information to determine a subset of a set of symbols of the TTI allocated to the UE, a symbol length or duration of the symbols allocated to the UE, and symbol level scheduling for the subset of the set of symbols within the TTI. In some cases, each of the set of symbols is associated with a downlink transmission. Communication component 1030 may communicate during the TTI using a set of beamformed transmissions based on the control information.

Timing component 1035 may determine a length of a guard interval, or a cyclic prefix, or a cyclic suffix, associated with the set of symbols of the TTI based on whether the symbols of the subset are contiguous or discontiguous in the TTI. Timing component 1035 may process the control information to determine that each symbol of the set of symbols of the TTI has a guard interval, or a cyclic prefix, or a cyclic suffix, and a length of the guard interval, or the cyclic prefix, or the cyclic suffix. Timing component 1035 may process the control information to determine that the set of symbols of the TTI do not have a guard interval, or a cyclic prefix, or a cyclic suffix. Timing component 1035 may process the control information to determine that the plurality of symbols of the TTI have a reduced guard interval (e.g., for beam switching). Timing component 1035 may determine a length of a guard interval between a first symbol of the set of symbols communicated prior to a beam switch and a second symbol of the set of symbols communicated after the beam switch.

Time division multiplexing schedule component 1040 may process the control information to determine a TDM schedule for the TTI. In some examples, the TDM schedule may indicate a scheduling order in the TTI for symbols in the subset of the set of symbols and communicate the subset of the set of symbols based on the TDM schedule for the TTI.

Pilot sequence component 1045 may measure a pilot sequence communicated between at least two symbols of the set of symbols. Decoding component 1050 may decode at least a subset of the set of beamformed transmissions based at least in the measured pilot sequence. Beam switch component 1055 may process the control information to identify timing information associated with a beam switch, and determine a symbol location of the plurality of symbols associated with the beam switch based on the timing information.

Figure 11:
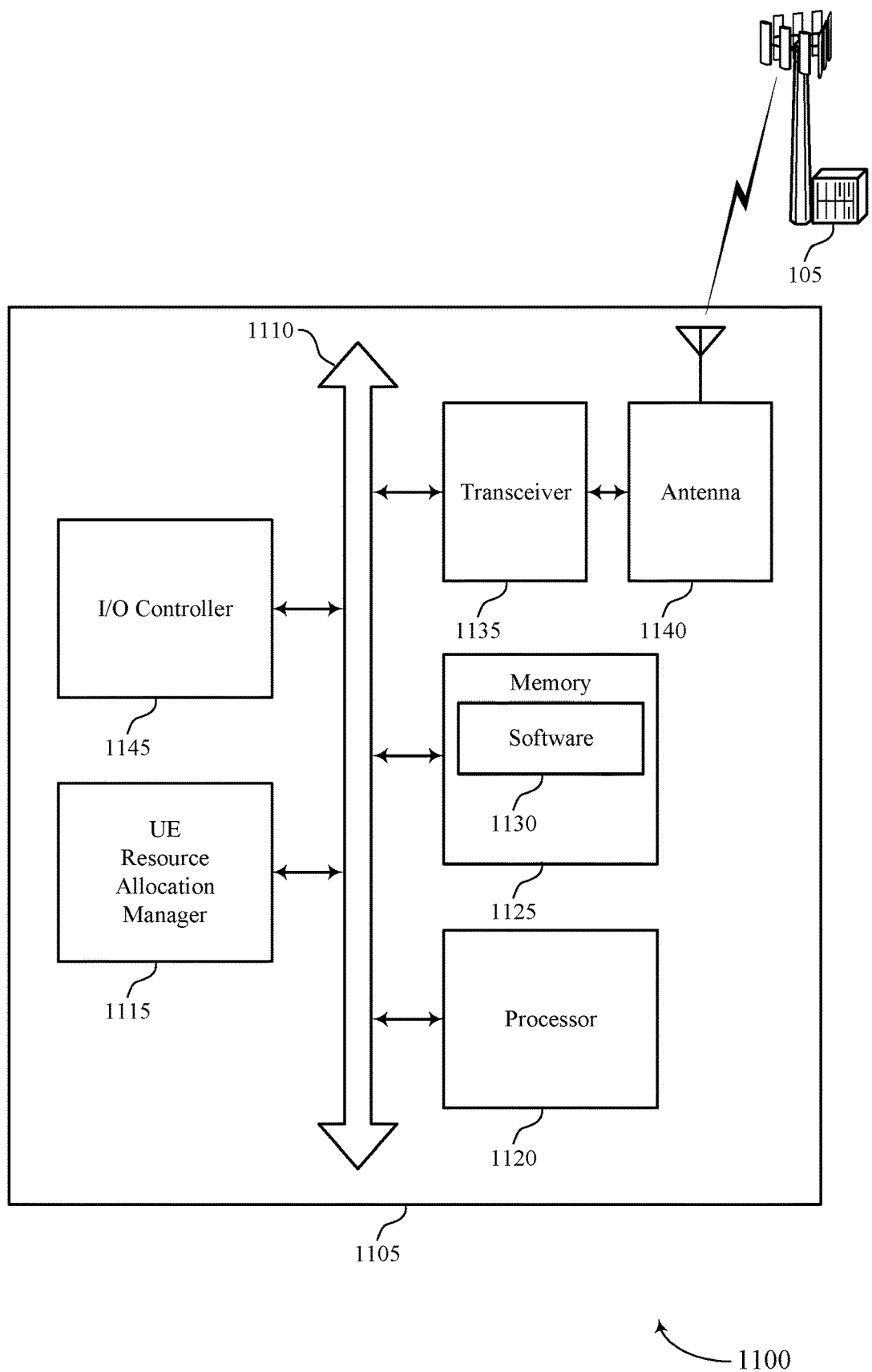
FIG. 11 illustrates a block diagram of a system including a UE that supports overhead reduction in mmW systems in accordance with aspects of the present disclosure.

FIG. 11 shows a diagram of a system 1100 including a device 1105 that supports overhead reduction in mmW systems in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE resource allocation manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute non-transitory computer-readable instructions stored in a memory to perform various functions (e.g., functions or tasks supporting symbol level TDM for overhead reduction in mmW systems).

Memory 1125 may include random access memory (RAM) and read only memory (ROM). The memory 1125 may store non-transitory computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support symbol level TDM for overhead reduction in mmW systems. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
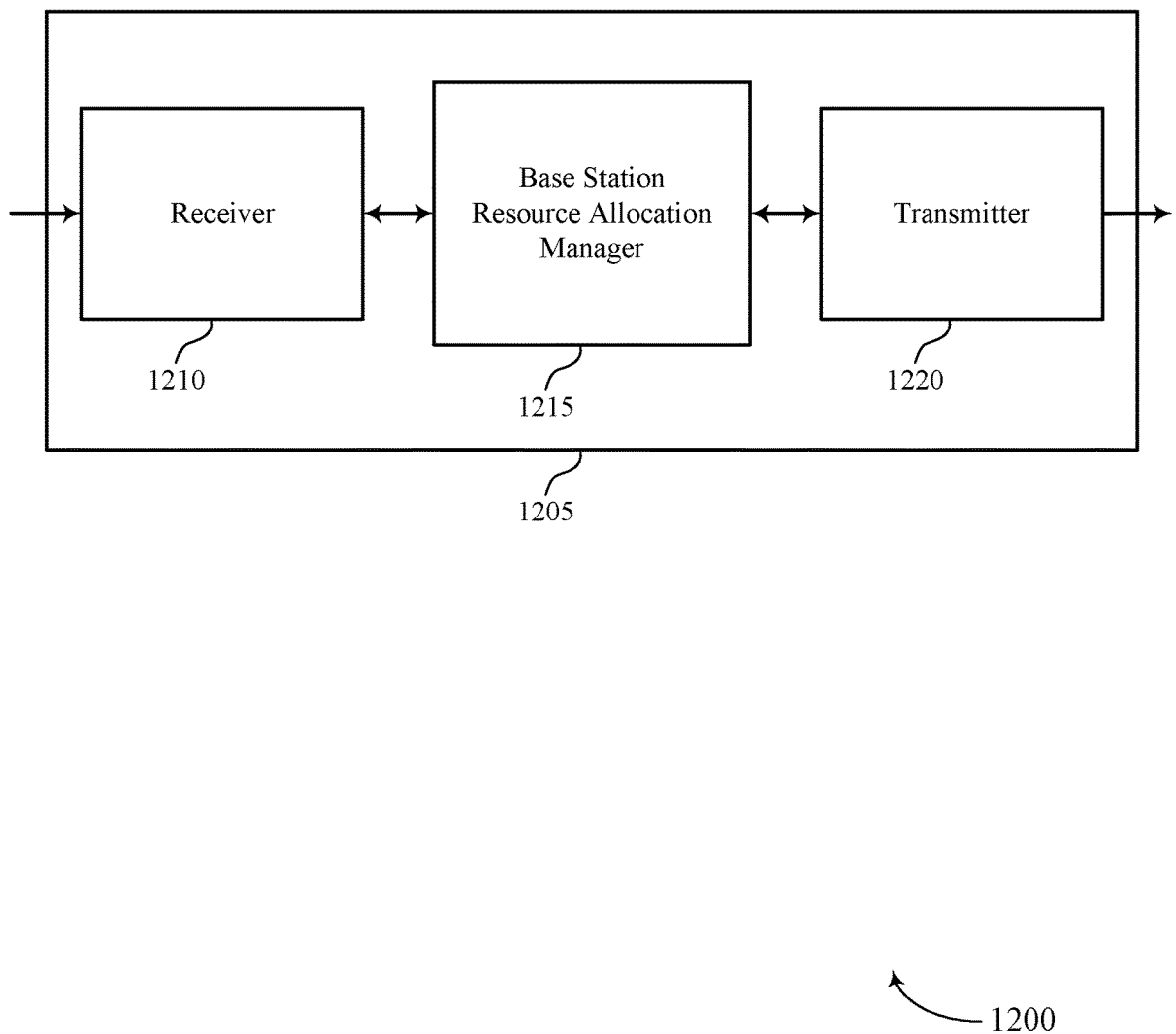
FIGS. 12 through 14 show block diagrams of a device that supports overhead reduction in mmW systems in accordance with aspects of the present disclosure.

FIG. 12 shows a block diagram 1200 of a wireless device 1205 that supports overhead reduction in mmW systems in accordance with aspects of the present disclosure. Wireless device 1205 may be an example of aspects of a base station 105 as described herein. Wireless device 1205 may include receiver 1210, base station resource allocation manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to symbol level TDM for overhead reduction in mmW systems, etc.). Information may be passed on to other components of the device. The receiver 1210 may be an example of aspects of the transceiver 1535 described with reference to FIG. 15. The receiver 1210 may utilize a single antenna or a set of antennas.

Base station resource allocation manager 1215 may be an example of aspects of the base station resource allocation manager 1515 described with reference to FIG. 15. Base station resource allocation manager 1215 and/or at least some of its various sub-components may be implemented in hardware, software executed by a processor, firmware, or any combination thereof. If implemented in software executed by a processor, the functions of the base station resource allocation manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station resource allocation manager 1215 and/or at least some of its various sub-components may be physically located at various positions, including being distributed such that portions of functions are implemented at different physical locations by one or more physical devices. In some examples, base station resource allocation manager 1215 and/or at least some of its various sub-components may be a separate and distinct component in accordance with various aspects of the present disclosure. In other examples, base station resource allocation manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource allocation manager 1215 may determine symbol level scheduling for a set of symbols allocated to a set of UEs within a TTI, transmit, in a control channel of the TTI, control information indicating the symbol level scheduling, and communicate, in accordance with the symbol level scheduling, the set of symbols within the TTI in a set of beamformed transmissions.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
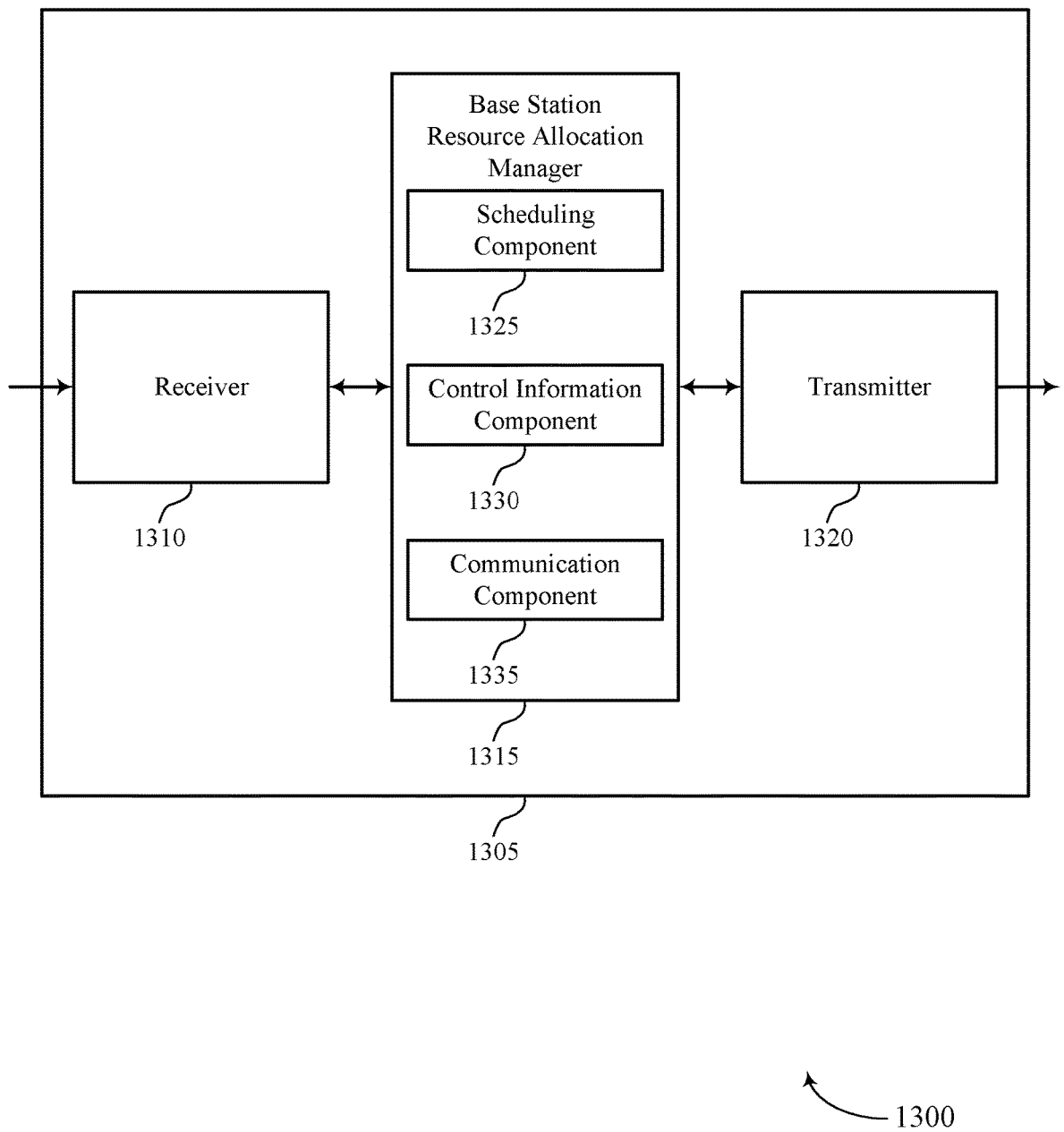

FIG. 13 shows a block diagram 1300 of a wireless device 1305 that supports overhead reduction in mmW systems in accordance with aspects of the present disclosure. Wireless device 1305 may be an example of aspects of a wireless device 1205 or a base station 105 as described with reference to FIG. 12. Wireless device 1305 may include receiver 1310, base station resource allocation manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to symbol level TDM for overhead reduction in mmW systems, etc.). Information may be passed on to other components of the device. The receiver 1310 may be an example of aspects of the transceiver 1535 described with reference to FIG. 15. The receiver 1310 may utilize a single antenna or a set of antennas.

Base station resource allocation manager 1315 may be an example of aspects of the base station resource allocation manager 1515 described with reference to FIG. 15. Base station resource allocation manager 1315 may also include scheduling component 1325, control information component 1330, and communication component 1335.

Scheduling component 1325 may determine symbol level scheduling for a set of symbols allocated to a set of UEs within a TTI. Control information component 1330 may transmit, in a control channel of the TTI, control information indicating the symbol level scheduling. Control information component 1330 may generate first control information indicating that a first subset of the set of symbols are allocated to a first UE of the set of UEs, and generate second control information indicating that a second subset of the set of symbols are allocated to a second UE of the set of UEs. In some cases, the first control information indicates that symbols of the first subset are contiguous or discontiguous in the TTI and the second control information indicates that symbols of the second subset are contiguous or discontiguous in the TTI.

Communication component 1335 may communicate, in accordance with the symbol level scheduling, the set of symbols within the TTI in a set of beamformed transmissions. Communication component 1335 may communicate, based on a determined length of a guard interval, a first beamformed transmission of the set of beamformed transmissions to communicate a first symbol using a first beam and a second beamformed transmission of the set of beamformed transmissions to communicate a second symbol using a second beam. In some cases, each of the set of beamformed transmissions is a downlink transmission.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
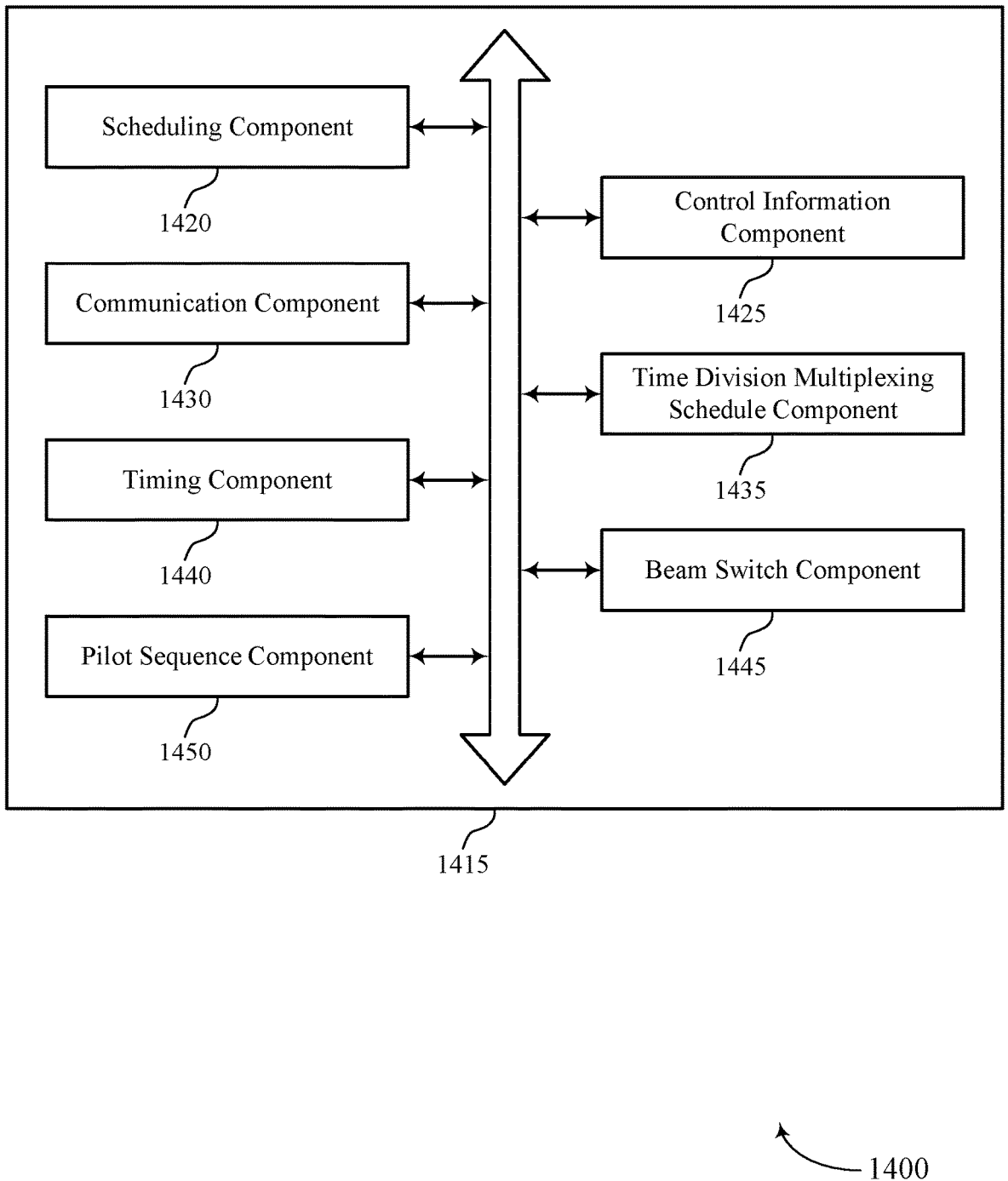

FIG. 14 shows a block diagram 1400 of a base station resource allocation manager 1415 that supports overhead reduction in mmW systems in accordance with aspects of the present disclosure. The base station resource allocation manager 1415 may be an example of aspects of a base station resource allocation manager 1515 described with reference to FIGS. 12, 13, and 15. The base station resource allocation manager 1415 may include scheduling component 1420, control information component 1425, communication component 1430, time division multiplexing schedule component 1435, timing component 1440, beam switch component 1445, and pilot sequence component 1450. Each of these modules may communicate, directly or indirectly, with one another (e.g., via one or more buses).

Scheduling component 1420 may determine symbol level scheduling for a set of symbols allocated to a set of UEs within a TTI. Control information component 1425 may transmit, in a control channel of the TTI, control information indicating the symbol level scheduling. Control information component 1425 may generate first control information indicating that a first subset of the set of symbols are allocated to a first UE of the set of UEs, and generate second control information indicating that a second subset of the set of symbols are allocated to a second UE of the set of UEs. In some cases, the first control information indicates that symbols of the first subset are contiguous or discontiguous in the TTI and the second control information indicates that symbols of the second subset are contiguous or discontiguous in the TTI.

Communication component 1430 may communicate, in accordance with the symbol level scheduling, the set of symbols within the TTI in a set of beamformed transmissions. Communication component 1430 may communicate, based on a determined length of a guard interval, a first beamformed transmission of the set of beamformed transmissions to communicate a first symbol using a first beam and a second beamformed transmission of the set of beamformed transmissions to communicate a second symbol using a second beam. In some cases, each of the set of beamformed transmissions is a downlink transmission.

Time division multiplexing schedule component 1435 may generate the control information to indicate a TDM schedule for the TTI. Time division multiplexing schedule component 1435 may communicate the set of beamformed transmissions based on the TDM schedule. Time division multiplexing schedule component 1435 may interleave, in the TTI, a first subset of the set of symbols allocated to a first UE of the set of UEs with a second subset of the set of symbols allocated to a second UE of the set of UEs. Time division multiplexing schedule component 1435 may unequally allocate the set of symbols between a first UE of the set of UEs and a second UE of the set of UEs. Time division multiplexing schedule component 1435 may unequally allocate a symbol length or duration within the TTI to the first UE of the plurality of UEs and the second UE of the plurality of UEs.

Timing component 1440 may determine a length of a guard interval, or a cyclic prefix, or a cyclic suffix, associated with each symbol of the set of symbols of the TTI. Timing component 1440 may communicate the set of symbols within the TTI based on the determined length, and determine a length of a guard interval between a first symbol of the set of symbols prior to the beam switch and a second symbol of the set of symbols after the beam switch. Beam switch component 1445 may perform a beam switch from a first beam to a second beam, in some examples, the control information may include timing information associated with the beam switch. Pilot sequence component 1450 may communicate a pilot sequence between at least two symbols of the set of symbols of the TTI.

Figure 15:
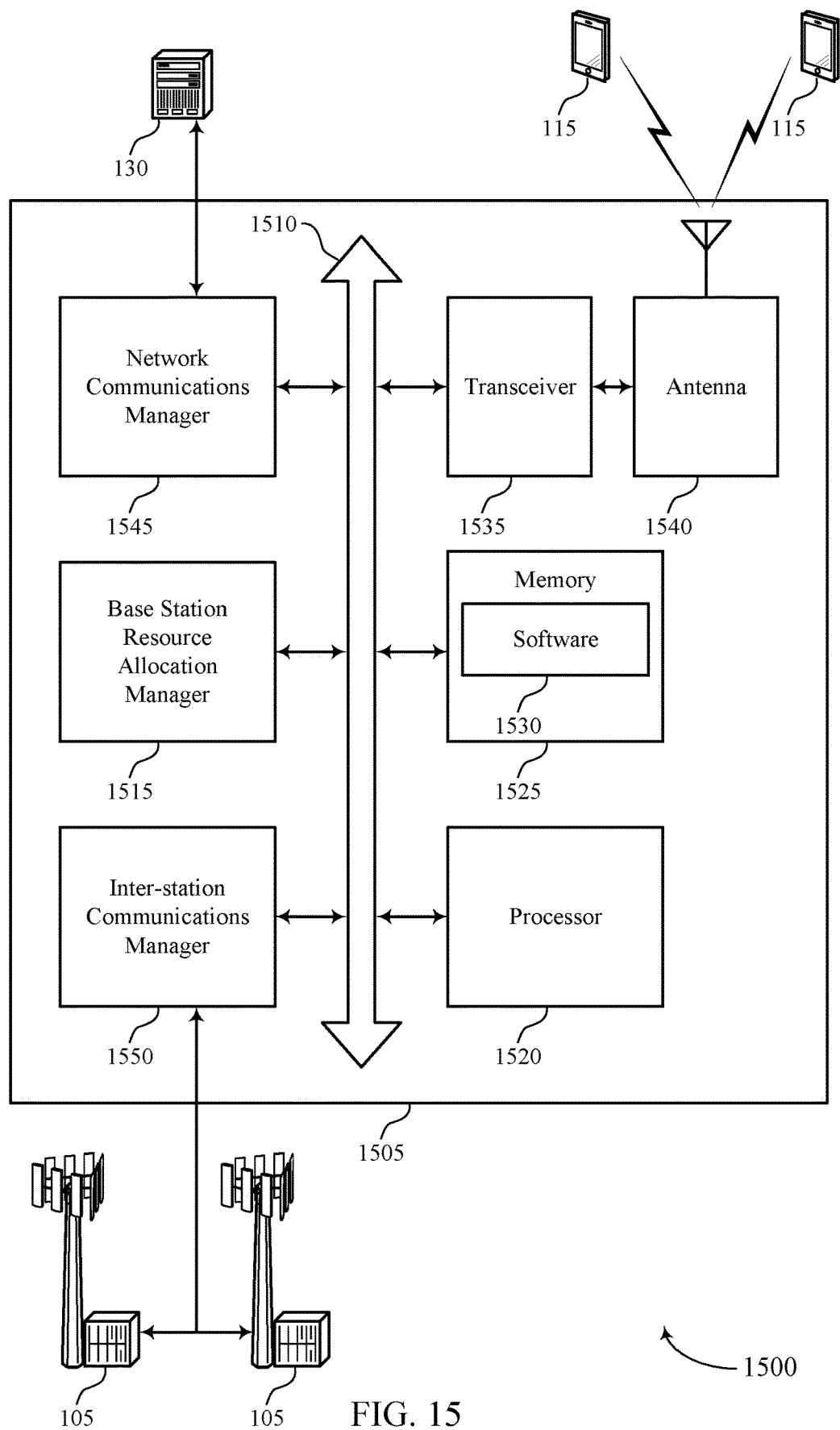
FIG. 15 illustrates a block diagram of a system including a base station that supports overhead reduction in mmW systems in accordance with aspects of the present disclosure.

FIG. 15 shows a diagram of a system 1500 including a device 1505 that supports overhead reduction in mmW systems in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station resource allocation manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute non-transitory computer-readable instructions stored in a memory to perform various functions (e.g., functions or tasks supporting symbol level TDM for overhead reduction in mmW systems).

Memory 1525 may include RAM and ROM. The memory 1525 may store non-transitory computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support symbol level TDM for overhead reduction in mmW systems. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
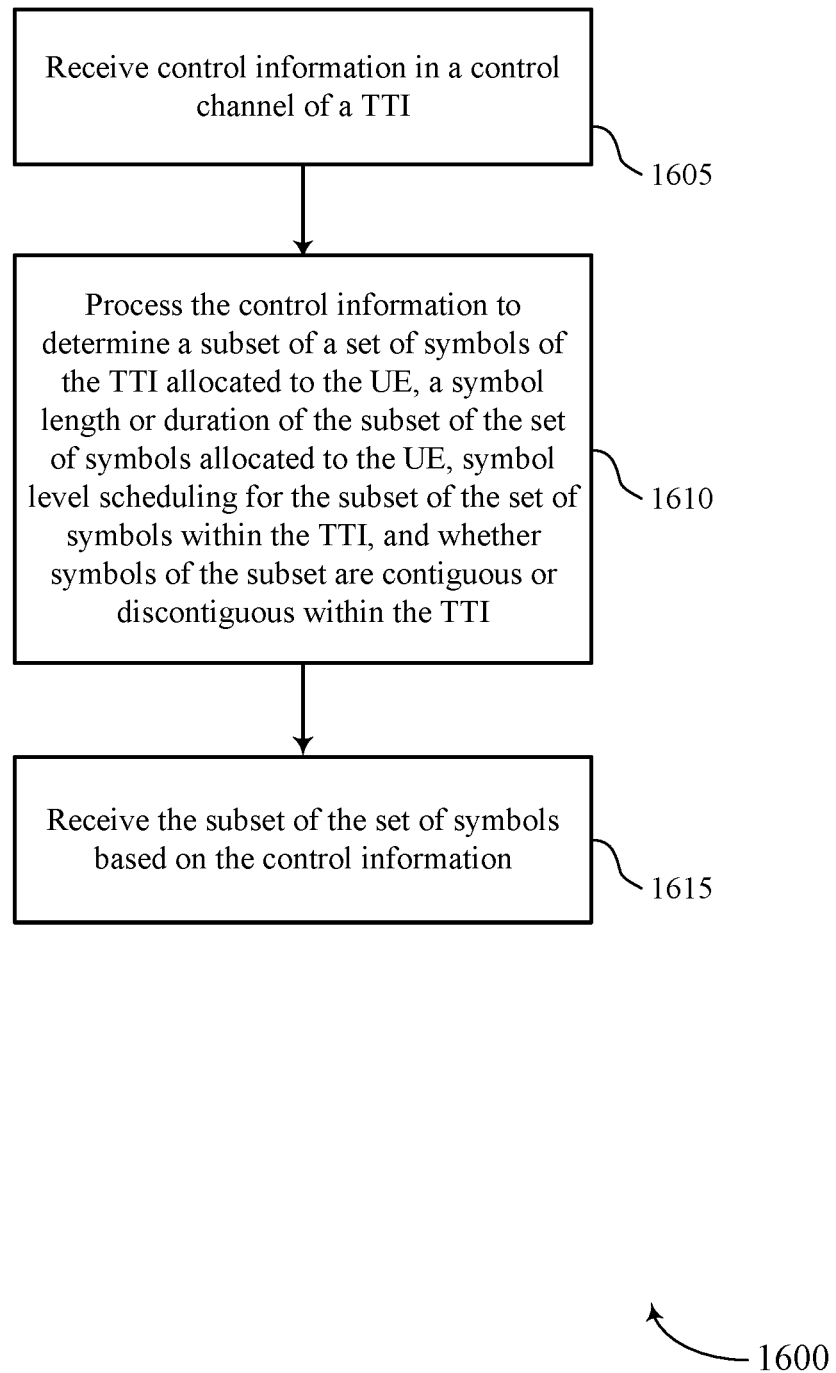
FIGS. 16 through 19 illustrate methods for overhead reduction in mmW systems in accordance with aspects of the present disclosure.

FIG. 16 shows a flowchart illustrating a method 1600 for overhead reduction in mmW systems in accordance with aspects of the present disclosure. The operations of method 1600 may be implemented by a UE 115 or its components as described herein. For example, the operations of method 1600 may be performed by a UE resource allocation manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive control information in a control channel of a TTI. The operations of 1605 may be performed according to the methods described herein. In some examples, aspects of the operations of 1605 may be performed by a control information component as described with reference to FIGS. 8 through 11.

At 1610 the UE 115 may process the control information to determine a subset of a set of symbols of the TTI allocated to the UE 115, a symbol length or duration of the set of symbols allocated to the UE, symbol level scheduling for the subset of the set of symbols within the TTI, and whether symbols of the subset are contiguous or discontiguous within the TTI. The operations of 1610 may be performed according to the methods described herein. In some examples, aspects of the operations of 1610 may be performed by a scheduling component as described with reference to FIGS. 8 through 11.

At 1615 the UE 115 may receive the subset of the set of symbols based on the control information. The operations of 1615 may be performed according to the methods described herein. In some examples, aspects of the operations of 1615 may be performed by a communication component as described with reference to FIGS. 8 through 11.

Figure 17:
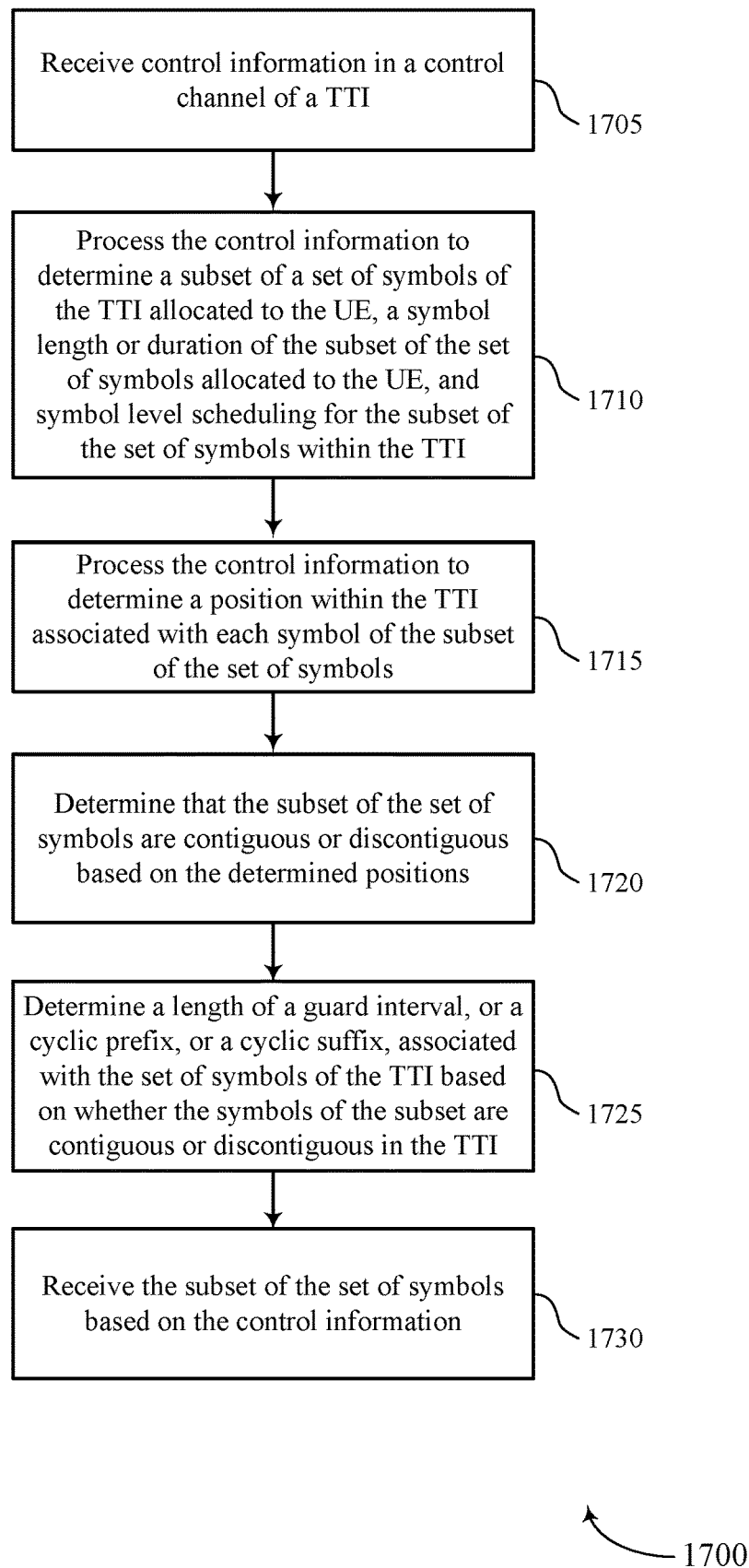

FIG. 17 shows a flowchart illustrating a method 1700 for overhead reduction in mmW systems in accordance with aspects of the present disclosure. The operations of method 1700 may be implemented by a UE 115 or its components as described herein. For example, the operations of method 1700 may be performed by a UE resource allocation manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive control information in a control channel of a TTI. The operations of 1705 may be performed according to the methods described herein. In some examples, aspects of the operations of 1705 may be performed by a control information component as described with reference to FIGS. 8 through 11.

At 1710 the UE 115 may process the control information to determine a subset of a set of symbols of the TTI allocated to the UE 115, a symbol length or duration of the symbols allocated to the UE 115, and symbol level scheduling for the subset of the set of symbols within the TTI. The operations of 1710 may be performed according to the methods described herein. In some examples, aspects of the operations of 1710 may be performed by a scheduling component as described with reference to FIGS. 8 through 11.

At 1715 the UE 115 may process the control information to determine a position within the TTI associated with each symbol of the subset of the set of symbols. The operations of 1715 may be performed according to the methods described herein. In some examples, aspects of the operations of 1715 may be performed by a control information component as described with reference to FIGS. 8 through 11.

At 1720 the UE 115 may determine that the subset of the set of symbols are contiguous or discontiguous based on the determined positions. The operations of 1720 may be performed according to the methods described herein. In some examples, aspects of the operations of 1720 may be performed by a control information component as described with reference to FIGS. 8 through 11.

At 1725 the UE 115 may determine a length of a guard interval, or a cyclic prefix, or a cyclic suffix, associated with the set of symbols of the TTI based on whether the symbols of the subset are contiguous or discontiguous in the TTI. The operations of 1725 may be performed according to the methods described herein. In some examples, aspects of the operations of 1725 may be performed by a timing component as described with reference to FIGS. 8 through 11.

At 1730 the UE 115 may receive the subset of the set of symbols based on the control information. The operations of 1730 may be performed according to the methods described herein. In some examples, aspects of the operations of 1730 may be performed by a communication component as described with reference to FIGS. 8 through 11.

Figure 18:
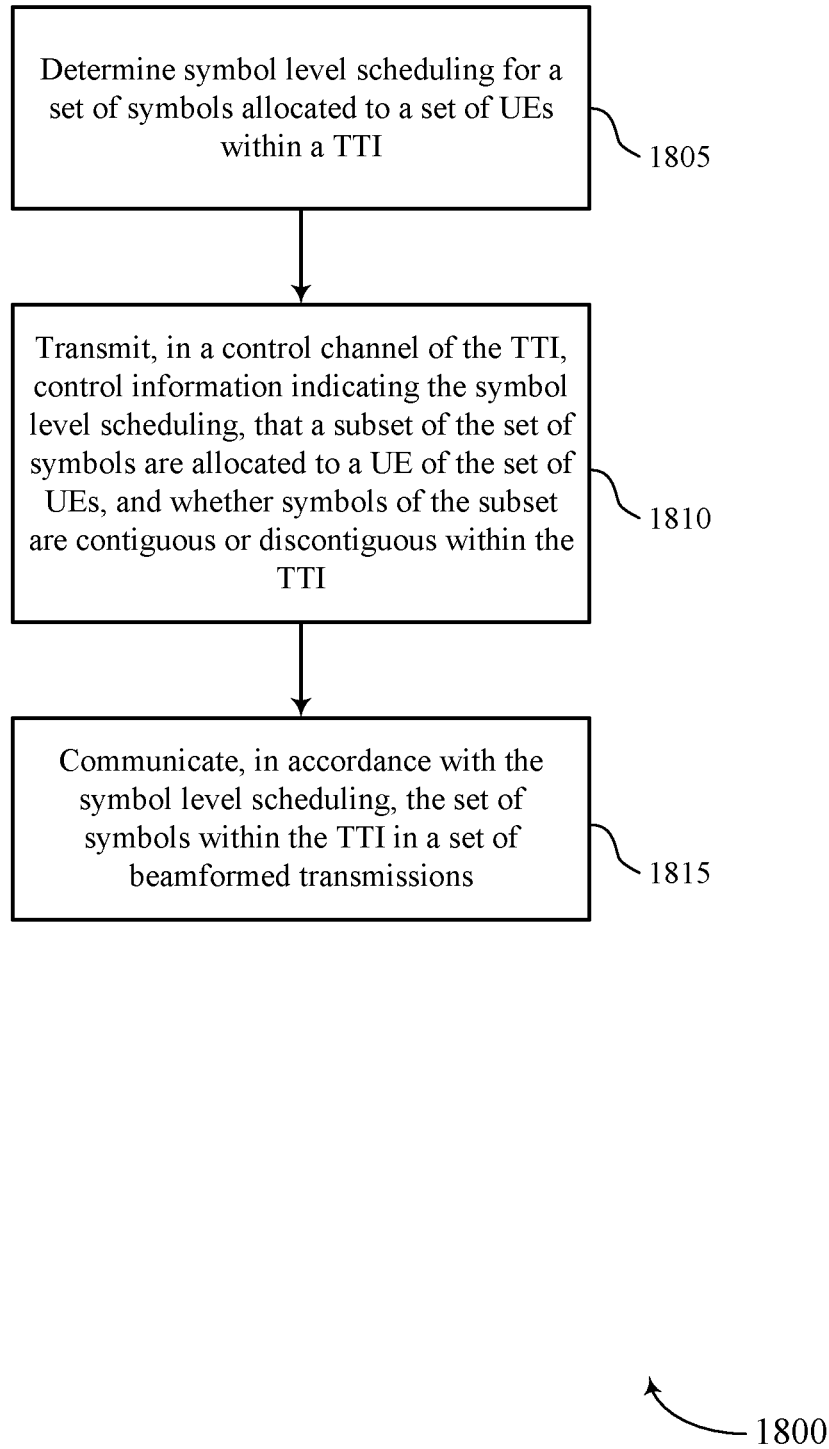

FIG. 18 shows a flowchart illustrating a method 1800 for overhead reduction in mmW systems in accordance with aspects of the present disclosure. The operations of method 1800 may be implemented by a base station 105 or its components as described herein. For example, the operations of method 1800 may be performed by a base station resource allocation manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may determine symbol level scheduling for a set of symbols allocated to a set of UEs within a TTI. The operations of 1805 may be performed according to the methods described herein. In some examples, aspects of the operations of 1805 may be performed by a scheduling component as described with reference to FIGS. 12 through 15.

At 1810 the base station 105 may transmit, in a control channel of the TTI, control information indicating the symbol level scheduling, that a subset of the set of symbols are allocated to a UE of the set of UEs, and whether symbols of the subset are contiguous or discontiguous within the TTI. The operations of 1810 may be performed according to the methods described herein. In some examples, aspects of the operations of 1810 may be performed by a control information component as described with reference to FIGS. 12 through 15.

At 1815 the base station 105 may communicate, in accordance with the symbol level scheduling, the set of symbols within the TTI in a plurality of beamformed transmissions. The operations of 1815 may be performed according to the methods described herein. In some examples, aspects of the operations of 1815 may be performed by a communication component as described with reference to FIGS. 12 through 15.

Figure 19:
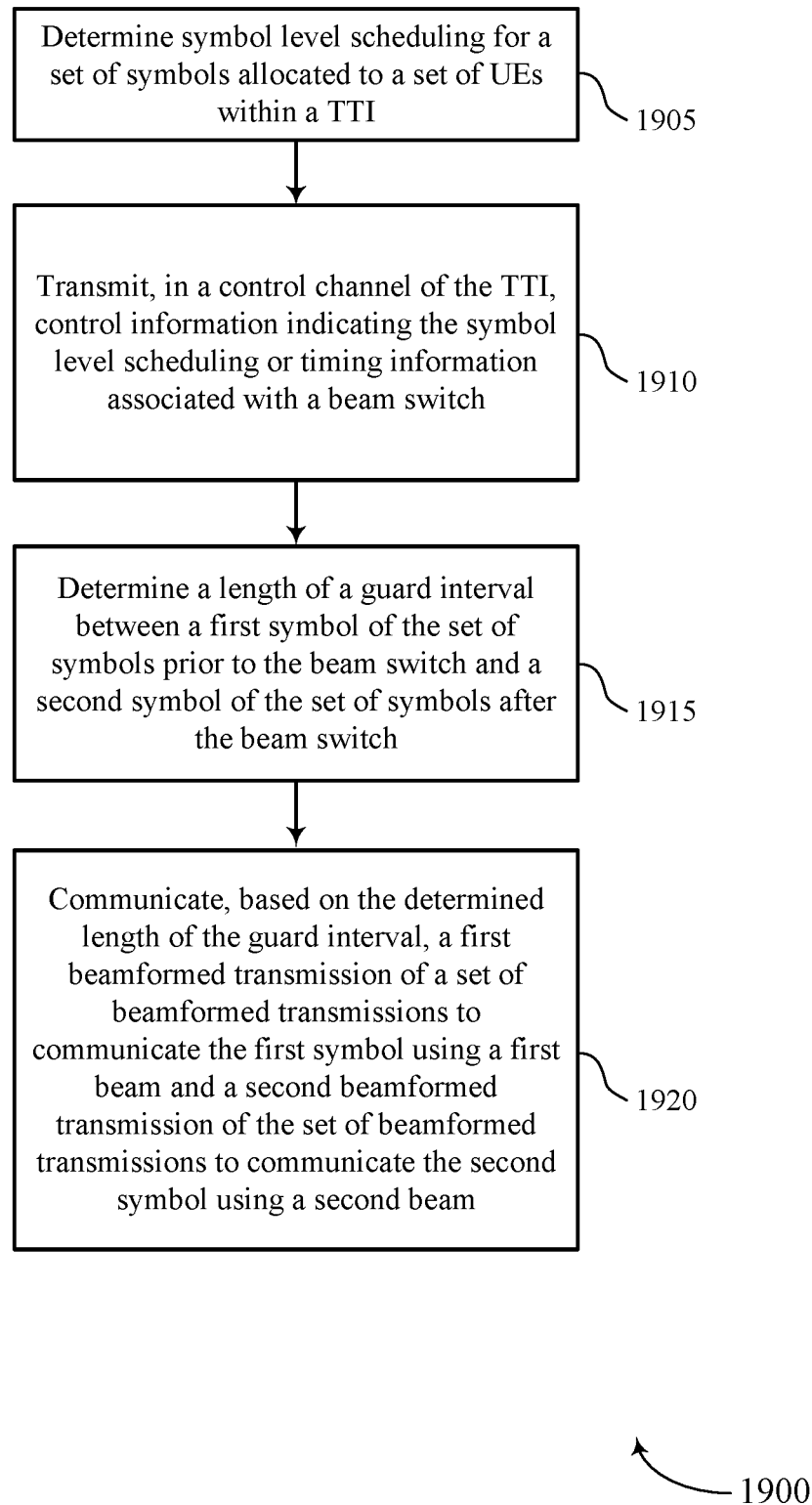

FIG. 19 shows a flowchart illustrating a method 1900 for overhead reduction in mmW systems in accordance with aspects of the present disclosure. The operations of method 1900 may be implemented by a base station 105 or its components as described herein. For example, the operations of method 1900 may be performed by a base station resource allocation manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may determine symbol level scheduling for a set of symbols allocated to a set of UEs within a TTI. The operations of 1905 may be performed according to the methods described herein. In some examples, aspects of the operations of 1905 may be performed by a scheduling component as described with reference to FIGS. 12 through 15.

At 1910 the base station 105 may transmit, in a control channel of the TTI, control information indicating the symbol level scheduling or timing information associated with a beam switch. The operations of 1910 may be performed according to the methods described herein. In some examples, aspects of the operations of 1910 may be performed by a control information component as described with reference to FIGS. 12 through 15.

At 1915 the base station 105 may determine a length of a guard interval between a first symbol of the set of symbols prior to the beam switch and a second symbol of the set of symbols after the beam switch. The operations of 1915 may be performed according to the methods described herein. In some examples, aspects of the operations of 1915 may be performed by a timing component as described with reference to FIGS. 12 through 15.

At 1920 the base station 105 may communicate, based at least in part on the determined length of the guard interval, a first beamformed transmission of a set of beamformed transmissions to communicate the first symbol using a first beam and a second beamformed transmission of the set of beamformed transmissions to communicate the second symbol using a second beam. The operations of 1920 may be performed according to the methods described herein. In some examples, aspects of the operations of 1920 may be performed by a communication component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a user equipment (UE), control information in a control channel of a transmission time interval (TTI);
   processing the control information to determine a subset of a plurality of symbols of the TTI allocated to the UE, a symbol length or duration of the subset of the plurality of symbols allocated to the UE, symbol level scheduling for the subset of the plurality of symbols within the TTI, and whether symbols of the subset are contiguous or discontiguous within the TTI;
   receiving the subset of the plurality of symbols based at least in part on the control information;
   measuring a pilot sequence communicated between at least two symbols of the plurality of symbols; and
   decoding at least a subset of a plurality of beamformed transmissions based at least on the measured pilot sequence.

2. The method of claim 1, further comprising:
   processing the control information to determine a position within the TTI associated with each symbol of the subset of the plurality of symbols; and determining that the symbols of the subset are contiguous or discontiguous based at least in part on the determined positions.

3. The method of claim 1, further comprising:
processing the control information to determine that each symbol of the plurality of symbols of the TTI has a guard interval, or a cyclic prefix, or a cyclic suffix, and a length of the guard interval, or the cyclic prefix, or the cyclic suffix, based at least in part on whether the symbols of the subset are contiguous or discontiguous within the TTI.

4. The method of claim 1, further comprising:
processing the control information to determine that the plurality of symbols of the TTI do not have a guard interval, or a cyclic prefix, or a cyclic suffix, based at least in part on the symbols of the subset being discontiguous within the TTI.

5. The method of claim 1, further comprising:
processing the control information to determine that the plurality of symbols of the TTI have a reduced guard interval, or a reduced cyclic prefix, or a reduced cyclic suffix, for beam switching, based at least in part on the symbols of the subset being discontiguous within the TTI.

6. The method of claim 1, further comprising:
processing the control information to determine that a second subset of the plurality of symbols are associated with a guard interval based at least in part on the symbols of the subset being discontiguous within the TTI, wherein the second subset of the plurality of symbols are not allocated to the UE.

7. The method of claim 1, further comprising:
determining the symbol length based at least in part on the control information.

8. The method of claim 1, further comprising:
determining a length of a guard interval, or a cyclic prefix, or a cyclic suffix, associated with the plurality of symbols of the TTI based at least in part on whether the symbols of the subset are contiguous or discontiguous within the TTI.

9. The method of claim 1, further comprising:
processing the control information to determine a time division multiplexing (TDM) schedule for the TTI, the TDM schedule indicating a scheduling order in the TTI for the symbols of the subset.

10. The method of claim 9, wherein receiving the subset of the plurality of symbols further comprises:
receiving the subset of the plurality of symbols based at least in part on the TDM schedule for the TTI.

11. The method of claim 1, further comprising:
processing the control information to identify timing information associated with a beam switch; and
determining a symbol location associated with the beam switch of at least one symbol of the plurality of symbols based at least in part on the timing information.

12. The method of claim 1, wherein each of the plurality of symbols is associated with a downlink transmission.

13. A method for wireless communication, comprising:
determining symbol level scheduling for a plurality of symbols allocated to a plurality of user equipments (UEs) within a transmission time interval (TTI);
transmitting, in a control channel of the TTI, control information indicating the symbol level scheduling, that a subset of the plurality of symbols are allocated to a UE of the plurality of UEs, and whether symbols of the subset are contiguous or discontiguous within the TTI; communicating, in accordance with the symbol level scheduling, the plurality of symbols within the TTI in a plurality of beamformed transmissions; and
transmitting second control information indicating that a second subset of the plurality of symbols are allocated to a second UE of the plurality of UEs, the second control information indicating a guard interval associated with the subset of the plurality of symbols allocated to the UE.

14. The method of claim 13, wherein the second control information indicates that symbols of the second subset are contiguous or discontiguous within the TTI.

15. The method of claim 13, further comprising:
determining that a first beamformed transmission allocated to the UE is via a first beam and a second beamformed transmission allocated to the second UE of the plurality of UEs is via a second beam; and
determining whether to time division multiplex (TDM) schedule the first beamformed transmission and the second beamformed transmission within the TTI based at least in part on whether the first beam is orthogonal to the second beam.

16. The method of claim 15, further comprising:
generating the control information to indicate the TDM schedule for the TTI; and
wherein communicating, in accordance with the symbol level scheduling, the plurality of symbols within the TTI in the plurality of beamformed transmissions further comprises:
communicating the plurality of beamformed transmissions based at least in part on the TDM schedule.

17. The method of claim 16, wherein communicating the plurality of beamformed transmissions based at least in part on the TDM schedule comprises:
interleaving, in the TTI, the subset of the plurality of symbols allocated to the UE with the second subset of the plurality of symbols allocated to the second UE of the plurality of UEs.

18. The method of claim 13, further comprising:
determining that a first beamformed transmission allocated to the UE is via a first beam and a second beamformed transmission allocated to the second UE of the plurality of UEs is via a second beam;
determining a length of a guard interval, or a cyclic prefix, or a cyclic suffix, associated with each symbol of the plurality of symbols of the TTI based at least in part on the first beam being orthogonal to the second beam, wherein communicating, in accordance with the symbol level scheduling, the plurality of symbols within the TTI further comprises:
communicating the plurality of symbols within the TTI based at least in part on the determined length.

19. The method of claim 13, further comprising:
performing a beam switch from a first beam to a second beam, wherein the control information comprises timing information associated with the beam switch;
determining a length of a guard interval between a first symbol of the plurality of symbols prior to the beam switch and a second symbol of the plurality of symbols after the beam switch, wherein communicating, in accordance with the symbol level scheduling, the plurality of symbols within the TTI in the plurality of beamformed transmissions comprises:
communicating, based at least in part on the determined length of the guard interval, a first beamformed transmission of the plurality of beamformed transmissions to communicate the first symbol using the first beam and a second beamformed transmission of the plurality of beamformed transmissions to communicate the second symbol using the second beam.

20. An apparatus for wireless communication, comprising:
   a processor;
   memory in electronic communication with the processor; and
   instructions stored in the memory and executable by the processor to cause the apparatus to:
receive, by a user equipment (UE), control information in a control channel of a transmission time interval (TTI);
process the control information to determine a subset of a plurality of symbols of the TTI allocated to the UE, a symbol length or duration of the subset of the plurality of symbols allocated to the UE, symbol level scheduling for the subset of the plurality of symbols within the TTI, and whether symbols of the subset are contiguous or discontiguous within the TTI;
receive the subset of the plurality of symbols based at least in part on the control information; and
process the control information to determine that the plurality of symbols of the TTI have a reduced guard interval, or a reduced cyclic prefix, or a reduced cyclic suffix, for beam switching, based at least in part on the symbols of the subset being discontiguous within the TTI.

21. The apparatus of claim 20, wherein the instructions are further executable by the processor to cause the apparatus to:
   process the control information to determine a position within the TTI associated with each symbol of the subset of the plurality of symbols; and
   determine that the symbols of the subset are contiguous or discontiguous based at least in part on the determined positions.

22. The apparatus of claim 20, wherein the instructions are further executable by the processor to cause the apparatus to:
   process the control information to determine that each symbol of the plurality of symbols of the TTI has a guard interval, or a cyclic prefix, or a cyclic suffix, and a length of the guard interval, or the cyclic prefix, or the cyclic suffix, based at least in part on whether the symbols of the subset are contiguous or discontiguous within the TTI.

23. The apparatus of claim 20, wherein the instructions are further executable by the processor to cause the apparatus to:
   process the control information to determine that the plurality of symbols of the TTI do not have a guard interval, or a cyclic prefix, or a cyclic suffix, based at least in part on the symbols of the subset being discontiguous within the TTI.

24. An apparatus for wireless communication, comprising:
   a processor;
   memory in electronic communication with the processor; and
   instructions stored in the memory and executable by the processor to cause the apparatus to:
determine symbol level scheduling for a plurality of symbols allocated to a plurality of user equipments (UEs) within a transmission time interval (TTI);
transmit, in a control channel of the TTI, control information indicating the symbol level scheduling, that a subset of the plurality of symbols are allocated to a UE of the plurality of UEs, and whether symbols of the subset are contiguous or discontiguous within the TTI;
communicate, in accordance with the symbol level scheduling, the plurality of symbols within the TTI in a plurality of beamformed transmissions; and
transmit second control information indicating that a second subset of the plurality of symbols are allocated to a second UE of the plurality of UEs, the second control information indicating a guard interval associated with the subset of the plurality of symbols allocated to the UE.

25. The apparatus of claim 24, wherein the second control information indicates that symbols of the second subset are contiguous or discontiguous within the TTI.

26. The apparatus of claim 24, wherein the instructions are further executable by the processor to cause the apparatus to:
   determine that a first beamformed transmission allocated to the UE is via a first beam and a second beamformed transmission allocated to the second UE of the plurality of UEs is via a second beam; and
   determine whether to time division multiplex (TDM) schedule the first beamformed transmission and the second beamformed transmission within the TTI based at least in part on whether the first beam is orthogonal to the second beam.

* * * * *